US010956726B1

(12) United States Patent
Quark et al.

(10) Patent No.: US 10,956,726 B1
(45) Date of Patent: Mar. 23, 2021

(54) OBFUSCATING PORTIONS OF VIDEO DATA

(71) Applicant: Amazon Technologies, Inc., Seattle, WA (US)

(72) Inventors: Adrian Quark, Cambridge, MA (US); Prathiban Mohanasundaram, Redmond, WA (US); Joseph M. Riley, Kent, WA (US); Danny Guan, Seattle, WA (US); Waqas Syed Ahmed, Clyde Hill, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/839,399

(22) Filed: Dec. 12, 2017

(51) Int. Cl.
*G06K 9/00* (2006.01)
*G06T 7/73* (2017.01)
*G06T 17/00* (2006.01)

(52) U.S. Cl.
CPC ..... *G06K 9/00369* (2013.01); *G06K 9/00771* (2013.01); *G06T 7/75* (2017.01); *G06T 17/00* (2013.01); *G06T 2215/16* (2013.01)

(58) Field of Classification Search
CPC .. G06K 9/00369; G06K 9/00771; G06T 7/75; G06T 17/00; G06T 2215/16
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 10,325,402 B1 * | 6/2019 | Wang | G06T 15/205 |
| 2003/0002712 A1 | 1/2003 | Steenburgh et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Xin Jia
(74) *Attorney, Agent, or Firm* — Athorus, PLLC

(57) ABSTRACT

Described are systems and methods for detecting objects using calibrated imaging devices and obfuscating, in real-time or near real time, portions of the video data to protect the privacy of operators represented in the video data. For example, a position of an operator within a fulfillment center may be determined or tracked in video data and the pixels representative of that operator may be obfuscated using pixilation and/or other techniques so that a reviewing agent that is viewing the video data cannot determine the identity of the operator. Such obfuscation may be performed in real-time or near real-time using automated processing. In addition, only portions of the video data may be obfuscated so that events (e.g., item picks, item place) and/or other objects represented in the video data are still viewable to the reviewing agent.

24 Claims, 11 Drawing Sheets

(56) References Cited

U.S. PATENT DOCUMENTS

| | | |
|---|---|---|
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0087572 A1* | 4/2012 | Dedeoglu .......... G06K 9/00771 382/154 |
| 2012/0218423 A1* | 8/2012 | Smith .................... G06Q 30/02 348/207.1 |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2016/0210518 A1* | 7/2016 | Script ................ G06K 9/00771 |
| 2018/0189505 A1* | 7/2018 | Ghafourifar ........ G06F 21/6209 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

OBFUSCATING PORTIONS OF VIDEO DATA

BACKGROUND

Today, the use of imaging devices such as digital video cameras for monitoring operations is widespread. For example, digital video cameras are often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Video cameras are also frequently installed in financial settings such as banks or casinos, where money changes hands in large amounts, at high rates of speed, or between large numbers of people.

While videoing facilities for monitoring is helpful, it presents privacy concerns for individuals at those facilities. Generated video data is often monitored by security and/or other human personnel for a variety of reasons. Currently, such video data may be viewed, and persons or other objects represented in the video data may be identified from the video data. While personnel that are authorized to monitor the video data may be instructed to not store the video data, comment on persons or objects represented in the videos, etc., there remains a risk that the privacy or identity of persons represented in the image data may be exposed.

DETAILED DESCRIPTION

As is set forth in greater detail below, the present disclosure is directed to systems and methods for tracking objects in three-dimensional (or "3D") space using one or more calibrated imaging devices and obfuscating representations of those objects in video data in real-time or near real-time as the video data is presented to one or more reviewing agents. For example, a position of an operator within a fulfillment center may be determined or tracked in video data and the pixels representative of that operator may be obfuscated using pixilation and/or other techniques so that a reviewing agent that is viewing the video data cannot determine the identity of the operator. Such obfuscation may be performed in real-time or near real-time using automated processing. In addition, only portions of the video data may be obfuscated so that events (e.g., item picks, item place) and/or other objects represented in the video data are still viewable to the reviewing agent.

Figure 1:
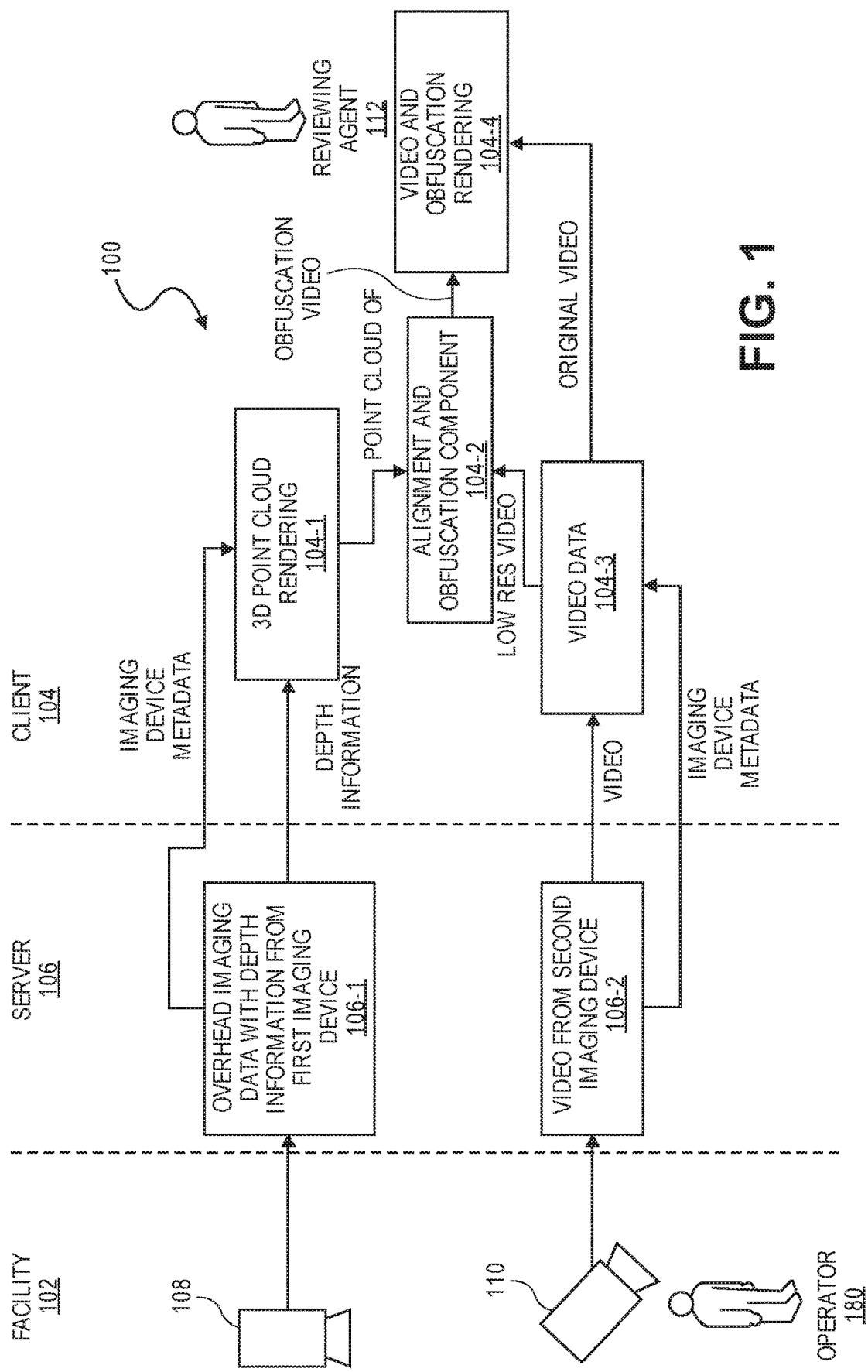
FIG. 1 is a block diagram of a video data obfuscation system, in accordance with implementations of the present disclosure.

FIG. 1 is a block diagram of an image data obfuscation system 100, in accordance with implementations of the present disclosure. As illustrated, two or more video cameras 108, 110 are positioned at a facility 102 or other location and oriented to have overlapping fields of view. In one implementation, and as discussed further below, the first camera 108 is an overhead camera that is mounted overhead (e.g., 8-10 feet above the facility surface) and oriented downward toward the area of a facility. The second imaging device 110, referred to herein as a side view imaging device, or side view camera is oriented at an angle with respect to the surface of the facility. The side view imaging device may be positioned on an inventory location, shelf, etc., and oriented at an angle toward the area of the facility. In other examples, the side view imaging device may be mounted overhead, like the overhead camera, but oriented at an angle toward the area of the facility. Likewise, the field of view of the two imaging devices 108 and 110 may at least partially overlap and the coordinates of imaging data captured by the imaging devices is calibrated. Fields of view may be considered to overlap if they both include or can view at least a portion of an object. In addition, in some implementations, one or both imaging devices 108, 110 may generate visual data, such as color image data (red-green-blue images or "RGB" images) and one or more of the imaging devices may generate depth information (e.g., depth data) from objects within their respective fields of view. In the illustrated example, the overhead imaging device 108 generates overhead imaging data that includes depth information 106-1 indicating a distance or depth of objects represented in the field of view of the overhead imaging device 108. The overhead imaging data may be provided to a server system 106 that may be local to the facility 102 or remote from the facility. Likewise, the side view imaging device 110 generates visible data 106-2 (e.g., video) that is provided to the server system 106. The visible data 106-2 provided by the side-view imaging device may include representations (i.e., video) of operators 180 located in the facility for which obfuscation is to be performed in real-time or near real time to inhibit identification of the operators when the video data is viewed, for example, by a reviewing agent 112.

In the illustrated example, processing and obfuscation of the video data may be performed on a client device 104, such as the client device utilized by a reviewing agent 112 to view the video data. In other implementations, processing and obfuscation may be performed on the server 106 and the obfuscated video data provided to the client device 104.

As discussed further below, processing of the video data includes utilization of the depth data from the overhead imaging data to render a 3D model 104-1 representative of foreground objects, such as an operator 180. The 3D model is then used in conjunction with the aligned video data to determine pixels in the video data that are to be obfuscated 104-2. For example, as discussed further below, because the imaging device 108 and 110 are aligned, the 3D depth information from the overhead imaging device 108 may be correlated or aligned with pixels of the video data from the side-view imaging device 110 and, based on the rendered 3D model, it can be determined which pixels of the video data are representative of the operator 180.

In some implantations, obfuscation may include using pixels of a lower resolution of the video data that are representative of the operator to form obfuscation video and then overlaying and rendering 104-4 the obfuscation video data concurrently with a presentation of the high-resolution video data 104-3 to produce obfuscated video data that obfuscates the portion of the original video data representative of the operator 180 so that the reviewing agent 112 cannot identify the operator 180. Through this process, the original video data 104-3 need not be altered, thereby reducing the amount of processing necessary to obfuscate the representation of the operator in the video data. In other implementations, the actual pixels of the high-resolution video data may be pixelated as part of the video rendering 104-4.

By processing and obfuscating the presentation of the video data based on a 3D tracking of objects in the video data, the obfuscation can be done in real-time or near real-time, thereby providing operator privacy and limiting the time delay between an occurrence of an event that is represented in the video data and a review of the video data by a reviewing agent. For example, if an event, such as an item pick or an item place is detected, but processing systems are unable to identify the item involved in the event (e.g., the item picked or the item placed), the portion of the video data representative of the event can be quickly and autonomously be obfuscated so that the video data can be reviewed by a reviewing agent to determine the item involved in the event, without revealing an identity of the operator represented in the video data presented to the reviewing agent.

Figure 2A:
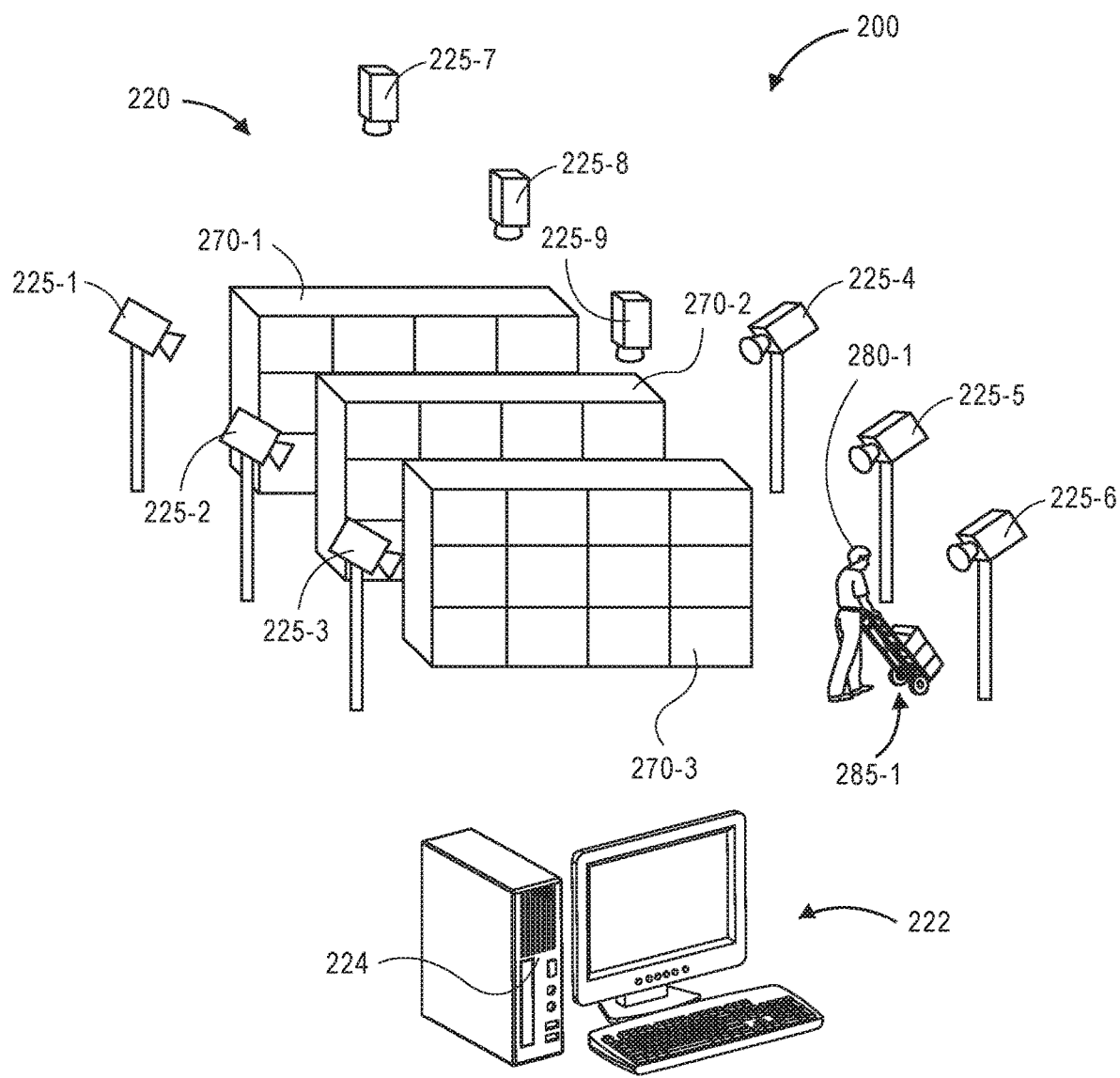
FIGS. 2A through 2C are views of aspects of one system for tracking and obfuscating objects in real-time or near real-time using calibrated cameras, in accordance with implementations of the present disclosure.
Figure 2B:
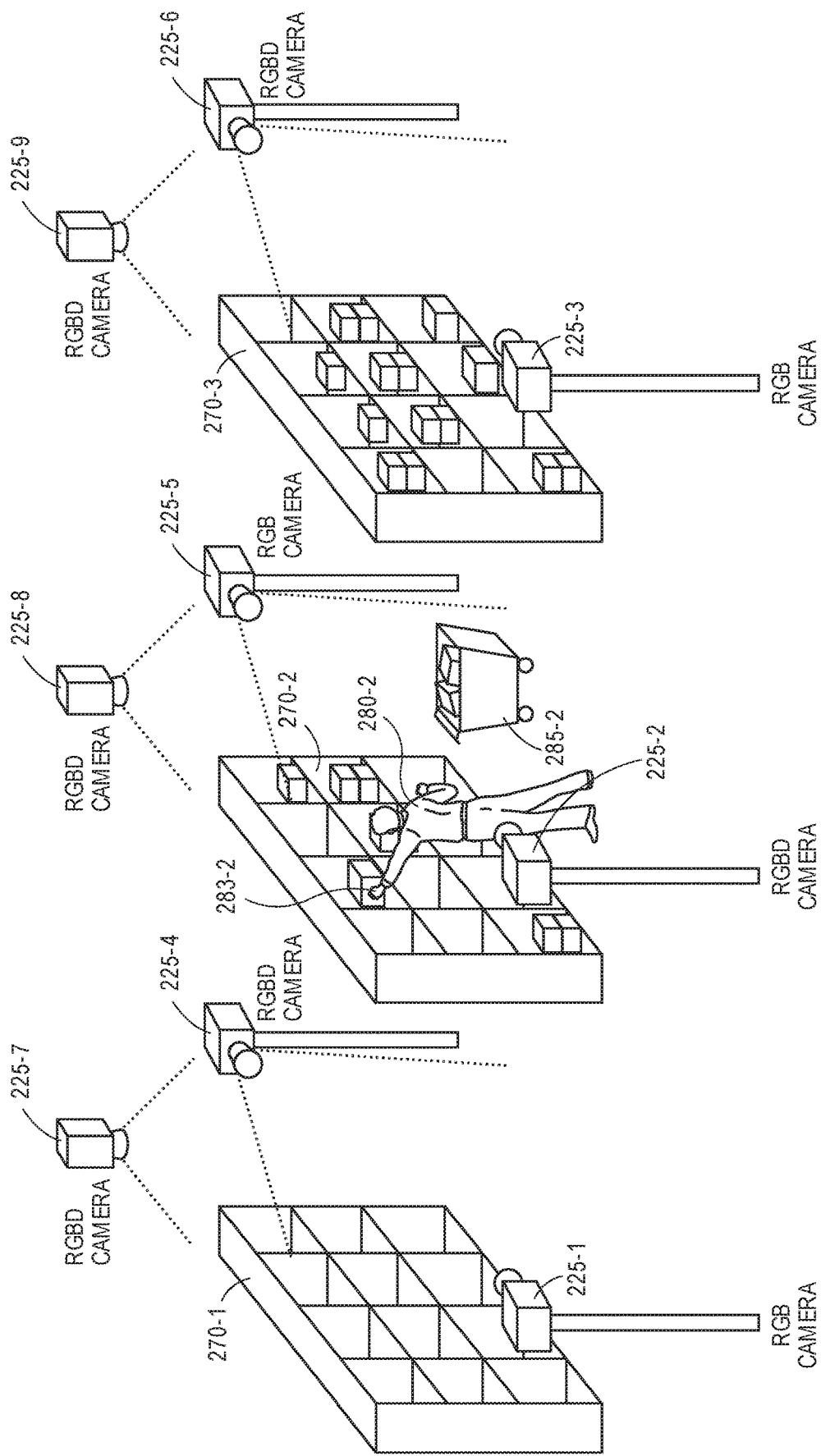
Figure 2C:
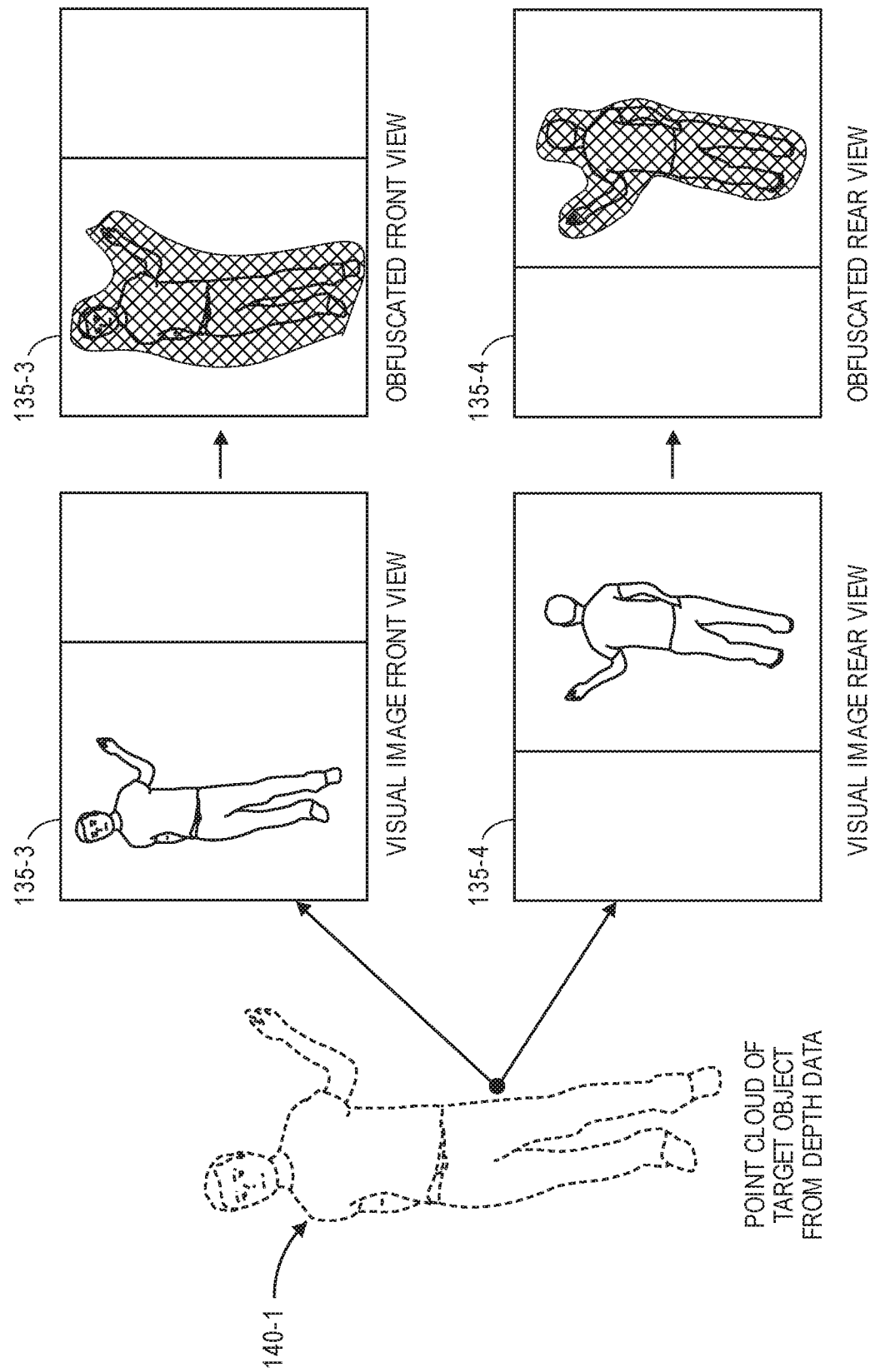

Referring to FIGS. 2A through 2C, views of aspects of one system 200 for tracking objects in 3D using calibrated cameras and obfuscating video data of those objects in real-time or near real time, in accordance with implementations of the present disclosure are shown. As is shown in FIGS. 2A and 2B, the system 200 includes a facility 220 having a plurality of cameras 225-1, 225-2, 225-3, 225-4, 225-5, 225-6, 225-7, 225-8, 225-9 and a plurality of shelving units 270-1, 270-2, 270-3 aligned in parallel with respect to one another. One or more operators 280-1, e.g., customers, workers, agents or other personnel, may travel throughout the facility 220 alone or with one or more carts 285-1 or dollies, hand trucks, bins or the like, such as between or among the various shelving units 270-1, 270-2, 270-3, during the performance of one or more tasks. For example, one or more of the operators 280-1 may pick one or more items from the various shelves of shelving units 270-1, 270-2, 270-3, or stow one or more items onto such shelves. Alternatively, one or more autonomous mobile robots may also perform one or more tasks within the facility 220, e.g., picking and/or storing items.

Each of the cameras 225-1, 225-2, 225-3, 225-4, 225-5, 225-6, 225-7, 225-8, 225-9 is calibrated, such that relationships between coordinates of imaging data captured by such cameras and directions relative to their respective image sensors are known. Moreover, each of the cameras 225-1, 225-2, 225-3, 225-4, 225-5, 225-6, 225-7, 225-8, 225-9 is also aligned and configured to capture imaging data in the form of visual images or video data and/or depth images (e.g., depth data or ranging data) from objects within their respective fields of view. For example, the camera 225-1 is an RGB camera (e.g., a camera configured to capture visual images, such as video data) aligned to include a front face of the shelving unit 270-1 within its field of view, while the camera 225-2 is an RGBD camera (e.g., a camera configured to capture both visual images and depth images) aligned to include a front face of the shelving unit 270-2 and spaces adjacent thereto within its field of view, and the camera 225-3 is an RGB camera aligned to include a front face of the shelving unit 270-3 within its field of view. Similarly, the cameras 225-4, 225-5, 225-6 are an RGBD camera, an RGB camera and an RGBD camera, respectively, that are aligned to include the front faces of the shelving units 270-1, 270-2, 270-3 and spaces adjacent to such shelving units 270-1, 270-2, 270-3 within their respective fields of view. The cameras 225-7, 225-8, 225-9 are RGBD cameras that are mounted aloft or overhead within the facility 220 and aligned to include spaces adjacent to the shelving units 270-1, 270-2, 270-3 within their fields of view.

Thus, each of the cameras 225-1, 225-2, 225-3, 225-4, 225-5, 225-6, 225-7, 225-8, 225-9 of the facility 220 shown in FIGS. 2A and 2B is configured to capture imaging data in the form of visual images and/or depth images regarding activity and/or interactions with one or more of the shelving units 270-1, 270-2, 270-3, including imaging data regarding specific aspects of the operators 280-1, carts 285-1, and/or any objects being transported throughout the facility 220, such as one or more items being picked from or stowed onto the shelving units 270-1, 270-2, 270-3.

In accordance with one or more implementations of the present disclosure, objects within an environment such as the facility 220 shown in FIGS. 2A and 2B may be tracked based on visual imaging data and depth imaging data captured using the cameras 225-1, 225-2, 225-3, 225-4, 225-5, 225-6, 225-7, 225-8, 225-9. Two or more cameras may be synchronized, and an initial position of a target object may be selected on any basis. The initial position of the target object may be identified and/or represented in any manner, such as by coordinates of a center or centroid of the target object, coordinates of each of a set or a collection of points corresponding to the object (e.g., in 3D space), or coordinates of a representative point of the target object, which may or may not be a center or centroid of the target object.

A set of the active cameras, or cameras that include at least a portion of a target object within their respective fields of view, may be identified and an extent to which the target object is visible or occluded from such fields of view may be determined. For example, for a given target object within a 3D bounding region, a portion of a 2D representation of the bounding region that appears within such fields of view of a digital camera or another imaging device may be determined. Likewise, degrees of occlusion of a target object within each of such fields of view may be determined in any manner. In some embodiments, a degree of occlusion may be determined by comparing a Z-buffer corresponding to a target object to a Z-buffer of other points within a field of view (e.g., a camera frustrum) spanned by a 2D representation of a 3D bounding region that is projected into the field of view, or in any other manner.

A 3D model representative of all available depth information regarding a physical scene may be defined, and two-dimensional predictions or hypotheses as to positions of the target object expressed in visual images captured at synchronized times may be determined and correlated with points in space (also referred to herein as real-world coordinates) expressed in the 3D model to determine positions of the target object in 3D space at the synchronized times.

As is shown in FIG. 2B, the operator 280-2 is shown as extending a left hand 283-2 upwardly and toward the front face of the shelving unit 270-2, e.g., to retrieve one or more items from a shelf of the shelving unit 270-2, or to stow one or more items thereon. The cameras 225-1, 225-2, 225-3, 225-4, 225-5, 225-6, 225-7, 225-8, 225-9 are synchronized, and a plurality of images are captured from a set of the cameras that include the operator 280-2 and the cart 285-2 in their respective fields of view. This set includes the camera 225-2, which captures the depth image and a visual image 230-4 from one side of the shelving unit 270-2 and spaces adjacent to a front face of the shelving unit 270-2, as well as the camera 225-5, which captures the visual image from another side of the shelving unit 270-2 and of the spaces adjacent to the front face of the shelving unit 270-2, and the camera 225-8, which captures the depth image from above the shelving unit 270-2 and the spaces adjacent to the front face of the shelving unit 270-2.

The depth image from imaging device 225-8 includes depth or ranging data regarding distances from the camera 225-8 to objects within its field of view at time ti, e.g., a top view of the shelving unit 270-2, including a distance $z_{1A}$ to an upper surface of the shelving unit 270-2, a distance $z_{2A}$ to the left hand 283-2 of the operator 280-2, a distance $z_{3A}$ to a head of the operator 280-2, a distance $z_{4A}$ to a torso of the operator 280-2, a distance $z_{5A}$ to upper surfaces of the cart 285-2, and a distance $z_{6A}$ to a floor or surface of the facility 220 in a vicinity of the shelving unit 270-2. The depth image from imaging device 225-2 similarly includes depth or ranging data regarding distances from the camera 225-2 to objects within its field of view at time $t_1$, e.g., a front view of the shelving unit 270-2, including a distance $z_{1B}$ to a left face of the shelving unit 270-2, a distance $z_{2B}$ to the left hand 283-2 of the operator 280-2, a distance $z_{3B}$ to the head of the operator 280-2, a distance $z_{4B}$ to the torso of the operator 280-2, a distance $z_{5B}$ to a right leg of the operator 280-2, a distance $z_{6B}$ to a basket or a bin of the cart 285-2, and a distance $z_{7B}$ to wheels of the cart 285-2.

The visual image or video data from the video camera 225-5 depicts colors, textures, outlines or other aspects of objects within a field of view of the camera 225-5 at time $t_1$, e.g., the front view of the shelving unit 270-2, including but not limited to colors, textures, outlines or other aspects of the shelving unit 270-2, the operator 280-2 and the cart 285-2. Similarly, the visual image or video data from camera 225-2 depicts colors, textures, outlines or other aspects of objects within a field of view of the camera 225-2 at time $t_1$, e.g., a rear view of the shelving unit 270-2, including but not limited to colors, textures, outlines or other aspects of the shelving unit 270-2, the operator 280-2, the left hand 283-2 and the cart 285-2.

As is discussed above, the systems and methods of the present disclosure may be utilized to track positions of objects in 3D space based on imaging data captured by multiple visual cameras and/or depth cameras (e.g., digital cameras) and to obfuscate some or all of the foreground objects detected in the video data. In some implementations, the positions of the objects may be identified or represented in any manner, such as by coordinates of a center or centroid of the target object, or coordinates of one or more of a set or a collection of points corresponding to the target object (e.g., one or more representative points), which may but need not include a center or a centroid of the target object. Moreover, the positions may be identified or represented according to any coordinate system, including but not limited to a rectangular (or Cartesian) coordinate system, e.g., with x, y and z coordinates with respect to an origin, or a polar coordinate system, e.g., with angular and radial coordinates with respect to a pole, or any other type or form of coordinate system.

In accordance with some implementations of the present disclosure, the tracking of objects in 3D space may begin with the identification of a "seed box" centered on a predicted initial position of a target object, viz., a peak height of the operator 280-2, with buffers of nominal lengths (e.g., ten centimeters) around a predicted initial position. The seed box may be established based on any type or form of triggering event, as represented by or in any type or form of information or data, and may be defined or oriented with respect to one or more points in space. For example, the seed box may be established based on depth imaging data captured by one or more depth cameras, based on colors, textures, outlines or other aspects expressed in visual imaging data captured by one or more visual cameras, or on a combination of depth imaging data and visual imaging data. Alternatively, the seed box may be established based on information or data captured, sensed or received from any type or form of sensor, including but not limited to a change in weight detected by a weight sensor provided in one or more shelves of a storage unit, a manual interaction with a touchscreen on which visual imaging data is presented, or any other information or data. The seed box may also be based on intrinsic or extrinsic data regarding objects, e.g., candidate target objects, including but not limited to locations of such objects, or one or more dimensions (such as lengths, widths, heights, diameters or weights), shapes or other aspects of such objects.

As is shown in FIG. 2C, a 3D model 240-1 of the operator 280-2 may be defined from the depth data and correlated with the video frames 230-2, 230-4 that are captured as part of video data produced from devices 225-5 and 225-2, respectively. Additionally, predictions of locations of the target object at time $t_1$ may be determined based on any colors, textures, outlines or other aspects of the object that are present within a two-dimensional representation of object. The pixels or groups of pixels corresponding to the target object within the visual images 235-2, 235-4 may be correlated with one another, with respect to the 3D model 240-1, e.g., by triangulation and/or based on the association with real-world coordinates.

Upon determination of the pixels of the visual image corresponding to the operator, either the pixels are obfuscated, for example using pixelization, and/or a secondary video data, referred to herein as obfuscation video, is rendered and presented concurrently with the video data to produce obfuscated video that obfuscates the pixels of the video data representative of the operator. For example, image 135-3 illustrates an obfuscated video frame of a front view of the operator by overlaying obfuscation video over the video frame 135-3 to obfuscate the identity of the operator. Likewise, image 135-4 illustrates an obfuscated video frame of a rear view of the operator by overlaying obfuscation video over the video frame 135-4 to obfuscate the identity of the operator. The obfuscation video may include low resolution pixels at the positions of the video data determined to represent the operator such that when the obfuscation video and the actual video data are rendered concurrently, the low-resolution pixels of the obfuscation video mask or obfuscate the identity of the operator.

Because some implementations do not actually pixelate or alter the actual video data but instead render and present concurrently with the video data an obfuscation video that obfuscates the identity of the operator, processing requirements are reduced. For example, the obfuscation video may be very low-resolution video data that includes transparent pixels for all portions of the video expect the portions corresponding to the position of the operator. Because the resolution of the obfuscation video data is very low, the portions of the video data corresponding to the operator will not provide enough information to a viewer to identify the operator. Likewise, because the obfuscation video is presented concurrently with the video data as an overlay, it will mask or hide the portion of the video data to includes a representation of the operator.

Accordingly, implementations of the systems and methods of the present disclosure may be used to track objects that are in motion in 3D space within materials handling facilities or like environments using imaging data (e.g., visual images and/or depth images) captured using RGB cameras, RGBD cameras, or other imaging devices, and obfuscate the portion of the video data that is presented to a reviewing agent such that the reviewing agent cannot identify the operator represented in the video data.

One or more imaging devices, including both visual cameras and depth cameras, may be synchronized and configured to capture imaging data from the scene. An active set of the imaging devices that include the target object within their fields of view, and in a sufficiently un-occluded manner, may be identified, and visual images and depth images of the target object may be captured at a synchronized time. A visual image may be an image channel or file captured from a scene by an imaging device, with the visual image including a plurality of pixels, and each of the pixels representing one or more color values for visible light captured by an image sensor from a portion of the scene that corresponds to one of the pixels (e.g., black-and-white, grayscale, or color according to any standard or color model, such as RGB, CMYK or the like). A depth image is an image or depth data channel or file captured from a scene by an imaging device, with the depth image including a plurality of pixels, and each of the pixels representing a range or distance from an image sensor to a portion of the scene that corresponds to one of the pixels. Alternatively, any other type of imaging data may be captured by imaging devices and utilized in accordance with one or more implementations of the present disclosure, including but not limited to infrared images, radiographic images or any other representations of captured light.

A 3D model of a target object may be defined based on one or more of the depth images. A 3D model may be a representation of depth data, or formed from depth data, corresponding to an object in which individual points in space that are associated with the object have coordinates defining their respective locations relative to an imaging system. A 3D model may be defined as a grouping of data points, with each point at a different location on a surface of an object. Each data point may have a set of coordinates according to a standard coordinate system (e.g., a rectangular or Cartesian coordinate system, a polar coordinate system). For example, in one implementation, the coordinates may define a position within a Cartesian space having three orthogonal axes, e.g., an x-axis, a y-axis and a z-axis, and the coordinates may be expressed as (x, y, z) with respect to such axes. The coordinates may further include a distance value, such that for each pixel designated with an x coordinate and a y coordinate with respect to an imaging sensor, and the distance from the imaging sensor to an object represented by that pixel being designated with a z coordinate.

A 3D model may be provided in an ordered form or an unordered form. Ordered 3D model data further includes a representation of a relationship between points. For example, ordered 3D model data may include a vector from one point to another, or may be expressed as a linked list of points. In some implementations, ordered 3D model data may be uniform in spatial distribution, such as in a regularly gridded two-dimensional or three-dimensional array. Unordered 3D model data may include data points in which information about relationships between such points is not known or included. Additionally, unordered 3D model data need not be uniform in spatial distribution. For example, unordered 3D model data provided by a 3D sensor may have data points which do not readily fit within a regularly gridded two-dimensional or three-dimensional array.

Because the imaging devices are calibrated and aligned to real-world coordinates, video data from a video camera may be mapped to points of the 3D model by mapping the real-world coordinates of the video data with the real-world coordinates of the 3D model. As a result, the foreground objects represented in the 3D model may be mapped to visual pixels of the video data representative of those foreground objects.

If a target object remains sufficiently visible within the scene, each of the imaging devices may be advanced to a next frame, the relationships between the 3D models and the video data updated accordingly, and the process for determining a position and the obfuscation of the target object may be repeated accordingly.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network, such as the Internet.

An imaging device that is configured to capture and store visual imaging data (e.g., color images) is commonly called an RGB imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or # NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as # FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure are directed to detecting objects in 3D space based on visual images (e.g., RGB images) and depth images (e.g., depth or ranging data), or any other type of images, that are captured using multiple imaging devices having fields of view that overlap on a scene, such as interior or exterior portions of a materials handling facility, a transportation center, a financial institution, or any other environment, and obfuscating in real-time or near real-time a portion of the image corresponding to an operator or other target object represented in the image. In particular, some implementations of the present disclosure are directed toward determining a 3D model representative of an operator based on depth information from one imaging device and then determining, for a second imaging device, pixels of the video data generated by that second imaging device that represent the operator. The pixels of the video data that represent the operator are determined based on the correlation of the video data with the 3D model. Finally, the portion of the video data representative of the operator is obfuscated when presented to a reviewing agent such that the reviewing agent is unable to determine an identity of the operator.

The systems and methods of the present disclosure may be utilized in any number of applications in which the tracking of objects and obfuscation of those objects in the video data is desired, including but not limited to tracking and obfuscating operators within a facility. As used herein, the term "facility" may include, but is not limited to, warehouses, distribution centers, cross-docking facilities, order fulfillment facilities, packaging facilities, shipping facilities, rental facilities, libraries, retail stores or establishments, wholesale stores, museums, hotel lobbies, common areas, subways, arenas, stadiums, outdoors, or other facilities or locations that include cameras or other imaging devices.

Figure 3:
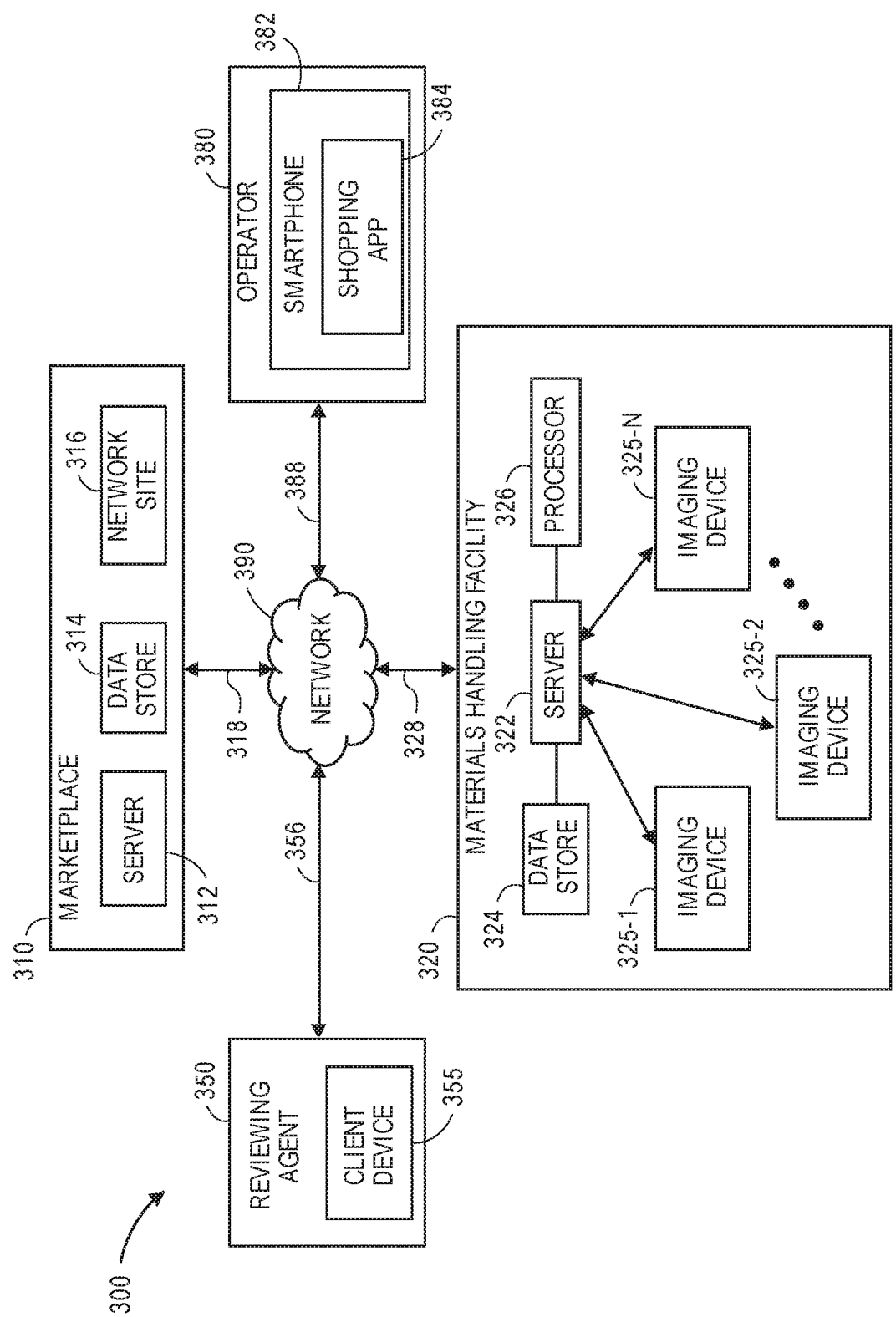
FIG. 3 is a block diagram of components of one system for tracking and obfuscating objects in real-time or near real-time using calibrated cameras, in accordance with implementations of the present disclosure.

Referring to FIG. 3, a block diagram of components of one system 300 for tracking and obfuscating objects in video data, in accordance with implementations of the present disclosure is shown. The system 300 includes a marketplace 310, a facility 320 and an operator (or actor, agent, or worker, or another human operator) 380 that are connected to one another across a network 390, such as the Internet.

The marketplace 310 may be any entity or individual that wishes to make items from a variety of sources (e.g., manufacturers, merchants, sellers or vendors) available for download, purchase, rent, lease or borrowing by operators using a networked computer infrastructure, including one or more physical computer servers 312 and data stores (e.g., databases) 314 for hosting a network site 316 (e.g., a web site). The marketplace 310 may be physically or virtually associated with one or more materials handling facilities, including but not limited to the facility 320. The network site 316 may be implemented using the one or more servers 312, which connect or otherwise communicate with the one or more data stores 314 as well as the network 390, as indicated by line 318, through the sending and receiving of digital data. The servers 312 may cause the display of information associated with the network site 316 in any manner, e.g., by transmitting code such as Hypertext Markup Language (HTML), over the network 390 to another computing device or resource that may be configured to generate and render the information into one or more pages or to cause a display of such pages on a computer display of any kind. Moreover, the data stores 314 may include any type of information regarding items that have been made available for sale through the marketplace 310, or ordered by operators (e.g., the operator 380) from the marketplace 310. The servers 312 may further execute any type of computer-based function or compute any type or form of calculation, including but not limited to any formulas, equations, algorithms or techniques for determining one or more probabilities or performing any number of statistical tests.

The facility 320 may be any facility that is adapted to receive, store, process and/or distribute items on behalf of the marketplace 310. The facility 320 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the facility 320. Upon their arrival at the facility 320, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage facility or another like unit, such as in bins, on shelves or via other suitable storage mechanisms. The inventory shelves, storage facilities or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large facility, such inventory items may be stored in several different locations to reduce congestion that might be encountered if the items are stored at a single location.

When a request or an order specifying one or more of the inventory items is received, or as a user progresses through the facility 320, inventory items that are listed in the request or order, or are desired by the user, may be selected or "picked" from an inventory area at the facility 320. For example, in one implementation, an operator or other user may travel through the facility 320 with a list (e.g., a paper list, or a handheld mobile device displaying or including such a list) and may pick one or more of the inventory items from an inventory area at the facility 320. In other implementations, an employee of the facility 320 or another user may pick one or more inventory items, as may be directed by one or more written or electronic pick lists derived from orders. In some instances, an inventory item may be retrieved and delivered to an operator or another user who placed a request for the inventory item. In other instances, the inventory item may require repositioning from one location within an inventory area to another location. For example, in some instances, an inventory item may be picked from a first location (e.g., a first inventory shelf or other storage facility) in an inventory area, moved a distance, and placed at a second location (e.g., a second inventory shelf or other storage facility) in the inventory area.

As is shown in FIG. 3, the facility 320 includes a networked computer infrastructure for performing various computer-related functions associated with the receipt, storage, processing and distribution of such items, including one or more physical computer servers 322, databases (or other data stores) 324 and processors 326, that may be provided in the same physical location as the facility 320, or in one or more alternate or virtual locations, e.g., in a "cloud"-based environment. In some implementations, the servers 322, the data stores 324 and/or the processors 326 or any number of other computing devices or resources may further execute any type of computer-based function or compute any type or form of calculation, including but not limited to any formulas, equations, algorithms or techniques for determining one or more probabilities or performing any number of statistical tests.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The facility 320 may include one or more inventory areas having predefined two-dimensional or three-dimensional storage facilities for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the facility 320 may further include one or more receiving stations featuring any apparatuses that may be required in order to receive shipments of items at the facility 320 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The facility 320 may further include one or more distribution stations where items that have been retrieved from a designated inventory area may be evaluated, prepared and packed for delivery from the facility 320 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the facility 320 may be transferred directly to a distribution station for further processing, or "cross-docked," without first being placed into storage in an intermediate inventory area. The facility 320 may also include one or more additional stations for receiving and distributing items to customers, as well as one or more conveying systems, autonomous mobile robots, or other manual or automated vehicles for transporting items between such stations or areas. The facility 320 may operate one or more order processing and/or communication systems using computer devices or resources in communication with one or more of the servers 322, the data stores 324 and/or the processors 326, or through one or more other computing devices or resources that may be connected to the network 390, as is indicated by line 328, in order to transmit or receive information in the form of digital or analog data, or for any other purpose.

The imaging devices 325-1, 325-2 . . . 325-*n* may be any form of optical recording device that may be used to photograph or otherwise record imaging data, such as video, of structures, facilities or any other elements within the facility 320, as well as any items within the facility 320, or for any other purpose. The imaging devices 325-1, 325-2 . . . 325-*n* may be mounted in any specific location or orientation within the facility 320, e.g., above, below or alongside one or more inventory areas or stations for receiving or distributing items.

The imaging devices 325-1, 325-2 . . . 325-*n* may include one or more sensors, memory or storage components and processors, and such sensors, memory components or processors may further include one or more photosensitive surfaces, filters, chips, electrodes, clocks, boards, timers or any other relevant features (not shown). The imaging devices 325-1, 325-2 . . . 325-*n* may capture imaging data in the form of one or more still or moving images of any kind or form, as well as any relevant audio signals or other information, within one or more designated locations within the facility 320. In some implementations, one or more of the imaging devices 325-1, 325-2 . . . 325-*n* may be configured to capture depth imaging data, e.g., distances or ranges to objects within their respective fields of view. In some implementations, one or more of the imaging devices 325-1, 325-2 . . . 325-*n* may be configured to capture visual imaging data, e.g., visual images or image frames in color, grayscale or black-and-white.

For example, one or more of the imaging devices 325-1, 325-2 . . . 325-*n* may be an RGB color camera, a still camera, a motion capture/video camera or any other type or form of camera. In other implementations, one or more of the imaging devices 325-1, 325-2 . . . 325-*n* may be depth-sensing cameras, such as a RGBD (or RGBz) camera. In still other implementations, one or more of the imaging devices 342 may be a thermographic or infrared (IR) camera. Additionally, in some implementations, the imaging devices 325-1, 325-2 . . . 325-*n* may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 325-1, 325-2 . . . 325-*n* may be paired to provide stereo imagery and depth information, and may include a pair of camera modules. Additionally, imaging data may be stored in any variety of formats including, but not limited to, YUYV, RGB, RAW, .bmp, .jpeg, .gif, or the like.

The imaging devices 325-1, 325-2 . . . 325-*n* may also include manual or automatic features for modifying their respective fields of view or orientations. For example, one or more of the imaging devices 325-1, 325-2 . . . 325-*n* may be configured in a fixed position, or with a fixed focal length (e.g., fixed-focus lenses) or angular orientation. Alternatively, one or more of the imaging devices 325-1, 325-2 . . . 325-*n* may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 325-1, 325-2 . . . 325-*n*, or changes in one or more of the angles defining the angular orientation.

For example, one or more of the imaging devices 325-1, 325-2 . . . 325-*n* may be hard-mounted to a support or mounting that maintains the device in a fixed configuration or angle with respect to one, two or three axes. Alternatively, however, one or more of the imaging devices 325-1, 325-2 . . . 325-*n* may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 325-1, 325-2 . . . 325-*n* may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of networks including one or more of the imaging devices 325-1, 325-2 . . . 325-*n*, e.g., digital cameras, may be affected based on the lighting conditions and characteristics of the scenes in which the imaging devices 325-1, 325-2 . . . 325-*n* are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the facility 320 of FIG. 3 includes boxes corresponding to three imaging devices 325-1, 325-2 . . . 325-*n*, those of ordinary skill in the pertinent arts will recognize that any number or type of imaging devices may be provided within a facility in accordance with the present disclosure, including but not limited to digital cameras, depth sensors or range cameras, infrared cameras, radiographic cameras or other optical sensors.

The facility 320 may also include any number of other sensors, components or other features for controlling or aiding in the operation of the facility 320, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The operator 380 may be any entity or individual that wishes to manually or automatically retrieve, evaluate and/or purchase one or more items maintained in an inventory area of the facility 320, or to download, purchase, rent, lease, borrow or otherwise obtain items (e.g., goods, products, services or information of any type or form) from the marketplace 310. The operator 380 may utilize one or more computing devices, such as a smartphone 382 or any other like machine that may operate or access one or more software applications, such as a web browser (not shown) or a shopping application 384, and may be connected to or otherwise communicate with the marketplace 310, or the facility 320 through the network 390, as indicated by line 388, by the transmission and receipt of digital data. For example, the operator 380 may use the smartphone 382 or another like client device to interact with one or more computer devices and/or input/output devices within the facility 320, and for any other purpose. Moreover, the operator 380 may retrieve items from the facility 320, and also receive deliveries or shipments of one or more items from facilities maintained by or on behalf of the marketplace 310, such as the facility 320.

Alternatively, or in addition to the operator 380, the facility 320 may also include additional operators, such as one or more workers, who may be any designated personnel tasked with performing one or more tasks within the facility 320 in general, or within one or more inventory areas, receiving stations, distribution stations or other locations of the facility 320 in particular. Such workers may handle or transport items (e.g., any type or form of good, product, media or other tangible consumer article) within the facility 320, or operate one or more pieces of equipment therein. The workers may also operate one or more specific computing devices or resources for registering the receipt, retrieval, transportation or storage of items within the facility 320, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the server 322, with one or more of the imaging devices 325-1, 325-2 . . . 325-*n*, or with one or more computer devices or resources, such as the server 312 or the smartphone 382, over the network 390, as well as a display (e.g., a touchscreen display) to facilitate the visible presentation to and interaction with a human operator. Such devices may be configured to store a unique identifier associated with a given human operator, and provide the unique identifier to the server 322 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the facility 320.

Also included in the system 300 is reviewing agent 350. The reviewing agent may be local to the facility or remote from the facility 320. As discussed herein, the reviewing agent 350 may be presented, through a client device 355, with obfuscated video data from one or more imaging devices 325 within the facility 320 representative of an event for which the reviewing agent is to provide additional information. For example, if one or more aspects of an event (e.g., event type, item involved in the event, etc.) cannot be autonomously determined, video data representative of the event and corresponding depth data may be sent to the presented client device 355 for presentation to the reviewing agent 350 so that the reviewing agent can provided the missing information. In some implementations, the video data and depth data may be provided by the server 322 of the facility 320 via the network 390 to the client device 355, as illustrated by lines 328 and 356. As discussed above, the client device 355 may process the depth data and video date to produce obfuscation video that is overlaid atop the video data to obfuscate portions of the video data so that the identity of operators represented in the video cannot be determined from by the reviewing agent.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "facility," or a "operator" (or "human operator" or "user") or like terms, may be automated steps performed by their respective computer devices or resources, or implemented within software modules (or computer programs) executed by one or more general purpose computers. Those of ordinary skill in the pertinent arts would also recognize that process steps described as being performed by a "marketplace," a "fulfillment center," or a "operator" (or "human operator" or "user") may be typically performed by a human, but could, alternatively, be performed by an automated agent.

The marketplace 310, the facility 320, the operator 380, and/or the reviewing agent 350 may use any web-enabled or Internet applications or features, or any other client-server applications or features including electronic mail (or E-mail), or other messaging techniques, to connect to the network 390 or to communicate with one another, such as through short or multimedia messaging service (SMS or MMS) text messages. For example, the server 322 may be adapted to transmit information or data in the form of synchronous or asynchronous messages from the facility 320 to the server 312, the smartphone 382, the client device 355, and/or any other computer device (e.g., any device having any number of other servers, data stores, processors or the like) in real time or in near-real time, or in one or more offline processes, via the network 390. Those of ordinary skill in the pertinent arts would recognize that the marketplace 310, the facility 320, the operator 380, and/or the reviewing agent 350 may operate any of a number of computing devices or resources that are capable of communicating over the network 390, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the server 312, the server 322, the imaging devices 325-1, 325-2 . . . 325-n or the smartphone 382, or any other computers or control systems utilized by the marketplace 310, the facility 320 or the operator 380 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing, obfuscation, and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 4A:
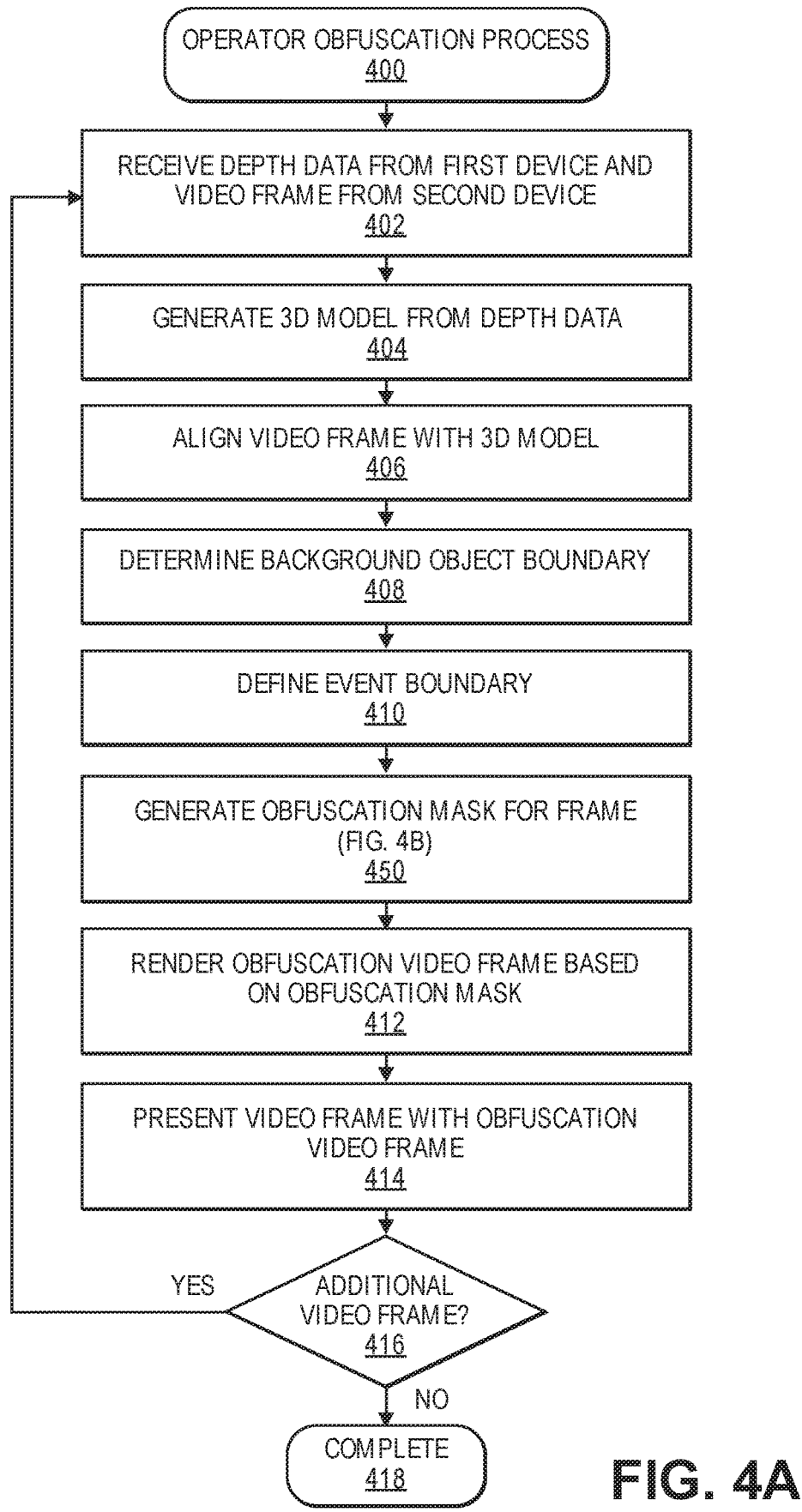
FIG. 4A is an example operator obfuscation process, in accordance with implementations of the present disclosure.

FIG. 4A is an example operator obfuscation process 400 for obfuscating in real-time, or near real-time, portions of video data representative of an operator, or operators, in accordance with described implementations. The example process 400 begins by obtaining depth data for a location, such as an inventory location, from a first device and video data for the location from a second device, as in 402. The example process may be performed on a frame by frame basis for video data and the depth data and the video data may be received frame by frame, as illustrated in block 402, and processed using the example process 400. In addition, while this example describes receiving depth data from a first device and video data from a second device, in other implementations the depth data and video data may be received from the same physical device that includes multiple sensors (e.g., a depth sensor and a video sensor).

As discussed above, in some implementations, the depth data may be obtained from an overhead imaging device (e.g., RGBD video camera) positioned above a location and the video data may be obtained from a side-view imaging device that is oriented toward the location. The depth data may include the depth information for each frame of video data obtained from the first device. For example, the first device may produce video data and each frame of the video data may include 160×120 pixels, each pixel including depth information corresponding to foreground objects or background objects within a field of view of the first device. In some implementations, the first video device may perform some initial processing on the depth data and subtract out or remove information corresponding to background objects (i.e., objects that are of a known position, shape, and size, and have been in the field of view of the first device for more than a defined period of time). The video data from the second device (which may be an RGB video camera) may be time synchronized with the first device such that frames from both devices are produced at approximately the same time. The first device and the second device may have the same or different frame rates and/or the same or different resolutions. For example, the video data of the second device may produce video data and each frame of the video data may include 1280×720 pixels.

As noted, the depth data of the first device and the video data of the second device are both aligned with real world coordinates and are time synchronized. For example, the depth data and the video data may be produced at twenty frames per second. In other implementations, the frame rate of the depth data may be higher or lower. Likewise, in other implementations, the resolution of the depth data and/or the video data may be higher or lower. In some implementations, the resolution of the depth data and the video data may be the same.

Utilizing the depth data for the frame, a three-dimensional (3D) model of foreground objects represented in that depth data is produced, as in 404. As discussed above, the 3D model may be a point cloud that indicates, for each pixel of the frame, a depth, or height from the background surface (e.g., floor, shelf). In other implementations, the 3D model may be representative of a skeletal model of the operator. For example, the depth data may be processed using one or more machine learning approaches (e.g., neural network) to determine shapes represented by the depth data. Based on the shapes, it may further be determined whether those shapes correspond to a skeletal structure of an operator.

For background objects represented in the depth data, the 3D model will not include data or points because the subtraction will result in no height difference. In comparison, depth information for pixels representative of foreground objects, such as operators, will be represented by a point in the 3D model that corresponds to a height of that portion of the foreground object represented by that pixel. Likewise, because the imaging devices are aligned with real-world coordinates, the point of the 3D model will be mapped to the real-world coordinate (e.g., x, y, z) for that point. In some implementations, the 3D model may be formed by background subtraction in which all pixels of a known or expected depth are subtracted such that only pixels corresponding to foreground objects remain.

As discussed above, the first device may be a defined distance from a surface (e.g., floor) of the location and the distance to background objects (e.g., floor, shelves, etc.) within the field of view of the first device may be known. When a foreground object, such as an operator, is in the field of view of the first device, the distance between the foreground object and the first device is detected and subtracted from the known distance from the background object usually represented by that pixel to represent a height value of the foreground object. Doing this for each pixel of a frame of the depth data received from the first device produces multiple height values of the foreground object(s), one for each pixel included in the frame. In addition, because the first device is aligned and calibrated to real-world coordinates, points of the 3D model are associated with the real-world coordinates. Collectively, the multiple heights at the different real-world coordinates form a 3D model of foreground objects represented in that frame of depth data. As discussed, this process 400 is performed for each frame, thereby producing a 3D model representative of the foreground object(s) in each frame of the depth data.

While this example discusses generating a 3D model from depth data of a first device, in some implementations, there may be multiple devices that generate depth data representative of foreground objects (i.e., multiple devices may have overlapping fields of view that include the foreground object(s)). In such an implementation, the depth data from each of those devices may be combined to form the 3D model for each frame.

In some implementations, to reduce noise in the 3D model, the points of the 3D model may be over-scaled such that each point in the 3D model represents multiple pixels of the depth data. For example, depth values from a group of adjacent pixels of a frame of the depth data may be combined (e.g., averaged) and a single point of the 3D model may represent that group of adjacent pixels. Likewise, the over-scaled points may share pixels of the 3D model data and overlap. In some implementations, the 3D models for each frame may be generated by rendering the depth data for each frame of the depth data using a WebGL shader that projects each pixel, or group of pixels, into the aligned real-world coordinates. In addition, because the points of the 3D model may be over-scaled, the rendered points may be slightly transparent and additive blending may be used to blend the appearance of multiple points that overlap. For example, as additional points of the 3D model are rendered, overlapping points may become opaquer. Over-scaling helps reduce both noise in the depth data and reduce gaps where depth data was not recorded.

Because each point of the 3D model is mapped to a known real-world coordinate, and because the second device is also aligned and calibrated with real world coordinates, each frame of the video data from the second device may be aligned with the 3D model generated from the corresponding frame of the depth data, as in 406. For example, the video data from the second device may be associated with different points of the 3D model corresponding to that frame by mapping the real-world coordinates of the frame of the video data to the real-world coordinates determined for the 3D model.

Figure 5:
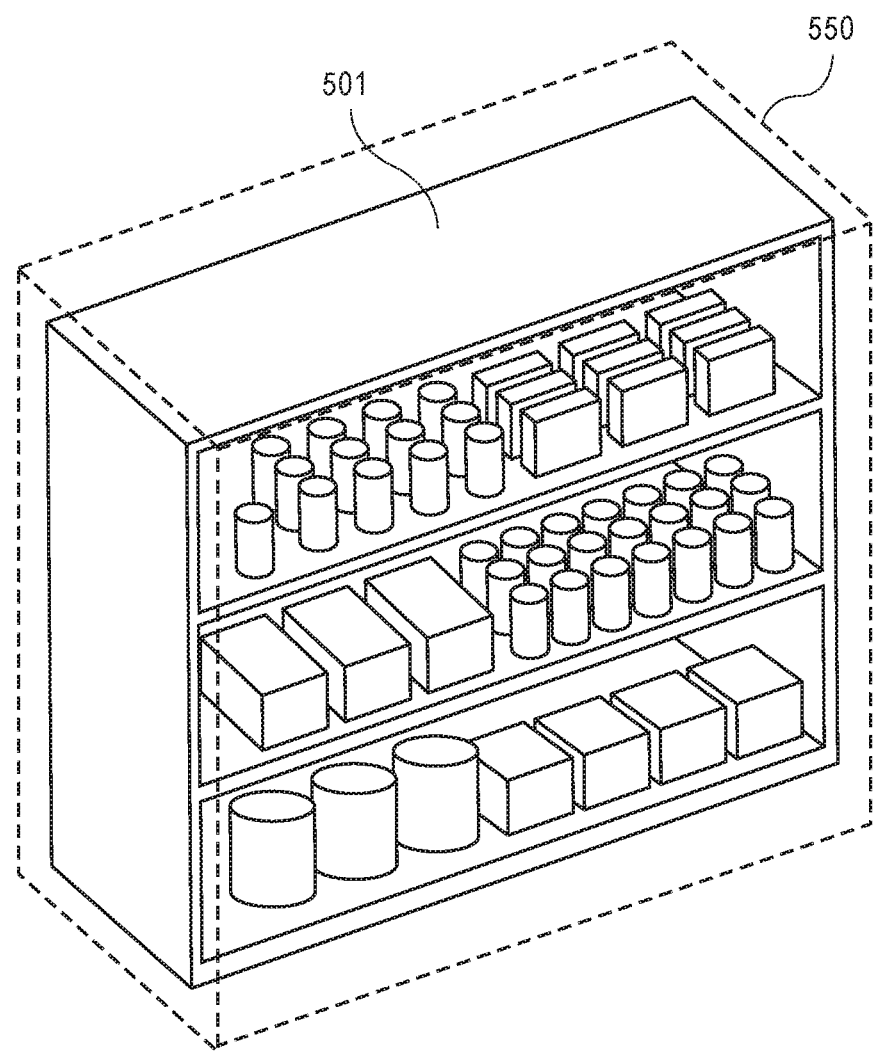
FIG. 5 is a view of a defined space for which obfuscation is not performed, in accordance with implementations of the present disclosure.

The example process may also determine a background object boundary for one or more background objects within a field of view of the second device that is producing the video data, as in 408. For example, referring to FIG. 5, the background object 501 is an inventory shelf and the background object boundary 550 is defined as the volumetric space surrounding the background object 501. In some implementations, the background object boundary may correspond to the dimensions of the background object. In other implementations, the background object boundary 550 may be slightly larger than the dimensions of the background object. In one example, the volumetric space 550 may be defined as approximately 110% of the dimensions of the background object 501. In other implementations, the background object boundary 550 may be greater or less than 110%. In some implementations, the background object boundary 550 may only encompass a portion of the background object, only encompass a portion of space adjacent or in-front of the background object, etc.

As discussed further below, the background object boundary may be used to identify pixels in the frames of image data that are not be obfuscated or excluded from an obfuscation mask so that a reviewing agent can have the information needed to detect an event represented in the video data. For example, if the event includes an operator reaching into an inventory shelf, the background object boundary defines pixels that represent the inventory shelf that are not to be obfuscated, even if the operator is reaching into the shelf. In such an example, as the operator's hand enters the shelf, the hand will not be obfuscated while positioned within the shelf, and the reviewing agent will be able to view the event that occurs within the shelf (e.g., an item pick or an item place). The background object boundary may be determined based on depth information and/or based on known position information for the background object(s).

Similarly, an event boundary may also be defined, as in 410. Similar to a background object boundary, the event boundary may be any defined area, such as a volumetric space. For example, the event boundary may be the volumetric space that includes the background object(s) for which a background object boundary has been defined and a region of space in front of the background object, such as an aisle or access area. In another example, the event boundary may identify areas that are known not to be potentially relevant to events. For example, the event boundary may identify the area at ends of shelves or above shelves as outside the event boundary.

As discussed further below, the event boundary may be used to identify pixels in the frames that are not potentially relevant to the event for which the reviewing agent will be reviewing the video data. For example, if the event includes an operator reaching into an inventory shelf, pixels representative of portions of the area that are above or past the end of the self are not potentially relevant to the event and may thus be obfuscated without hindering the reviewing agent's ability to determine the event. Obfuscation of video data outside the event boundary that is not potentially relevant to the event provides additional privacy and security by obfuscating video data that may include representations of other operators.

Based on a mapping of the pixels of the video frame with the 3D model, the background object boundary, and the event boundary, an obfuscation mask is generated for the frame of video data, as in 450. As discussed further below with respect to FIG. 4B, the obfuscation mask identifies pixels of the video frame that are to be obfuscated when the video data is presented on the client device to the reviewing agent.

Based on the obfuscation mask for the video frame, an obfuscation video frame is rendered, as in 412. The obfuscation video frame includes pixel values for pixels that will cause each of the pixels of the video data identified in the obfuscation mask to be obfuscated when presented on the client device. In one implementation, a very low-resolution frame of the video frame may be produced, and portions of that very low-resolution frame may be utilized to produce the obfuscation video. For example, any pixels of the very low-resolution frame that do not correspond to a position of a pixel identified in the obfuscation mask may be set to a transparent value in the obfuscation video frame. In comparison, any pixel of the very low-resolution frame that does correspond to a position of a pixel identified in the obfuscation mask may be retained as part of the obfuscation video frame. In other examples, the obfuscation video frame may include pixels with random color values, or solid color values (e.g., black, gray) for any pixels that are identified in the obfuscation mask and no color values (transparent) for pixels not identified in the obfuscation mask. As will be appreciated, the pixel configuration of the obfuscation video data may be different than the pixel configuration of the video data. For example, the video data may have more pixels than the obfuscation video data. As such, one pixel of the obfuscation video data may correspond or be used to obfuscate multiple pixels of the original video data. In still other examples, rather than forming an obfuscation video frame that is overlaid atop the original video frame, pixel values of pixels of the original video frame that correspond to a position identified in the obfuscation mask may be altered to obfuscate the agent. For example, random numbers may be assigned as the values for pixels of the original video frame that are to be obfuscated.

The video frame and the obfuscation video frame are then presented concurrently on the client device such that the obfuscation video frame is overlaid atop the video frame, as in 414. Presenting the obfuscation video frame as an overlay atop the video frame results in pixels of the video frame that correspond to transparent pixels of the obfuscation video being presented to the reviewing agent and pixels of the video frame corresponding to obfuscation pixels of the obfuscation video frame being obfuscated so that the reviewing agent cannot identify the operator represented in that portion of the video frame.

A determination is then made as to whether there is an additional frame of the video data that is being received by the example process, as in 416. If there is an additional frame, the example process 400 returns to block 402, receive the next frame of depth data and video data and continues. If it is determined that there are no additional frames, the example process 400 completes, as in 418.

As discussed above, the example process 400 may be performed in real-time or near real-time on a frame by frame basis to produce obfuscated video data that is presented on a client device to a reviewing agent so that the reviewing agent can determine different aspects of an event without revealing the identity of operators represented in the video data. Accordingly, the described implementations provide a technical advantage of increased privacy and security for operators represented in video data while, at the same time, not significantly delaying the presentation of the video data.

Figure 4B:
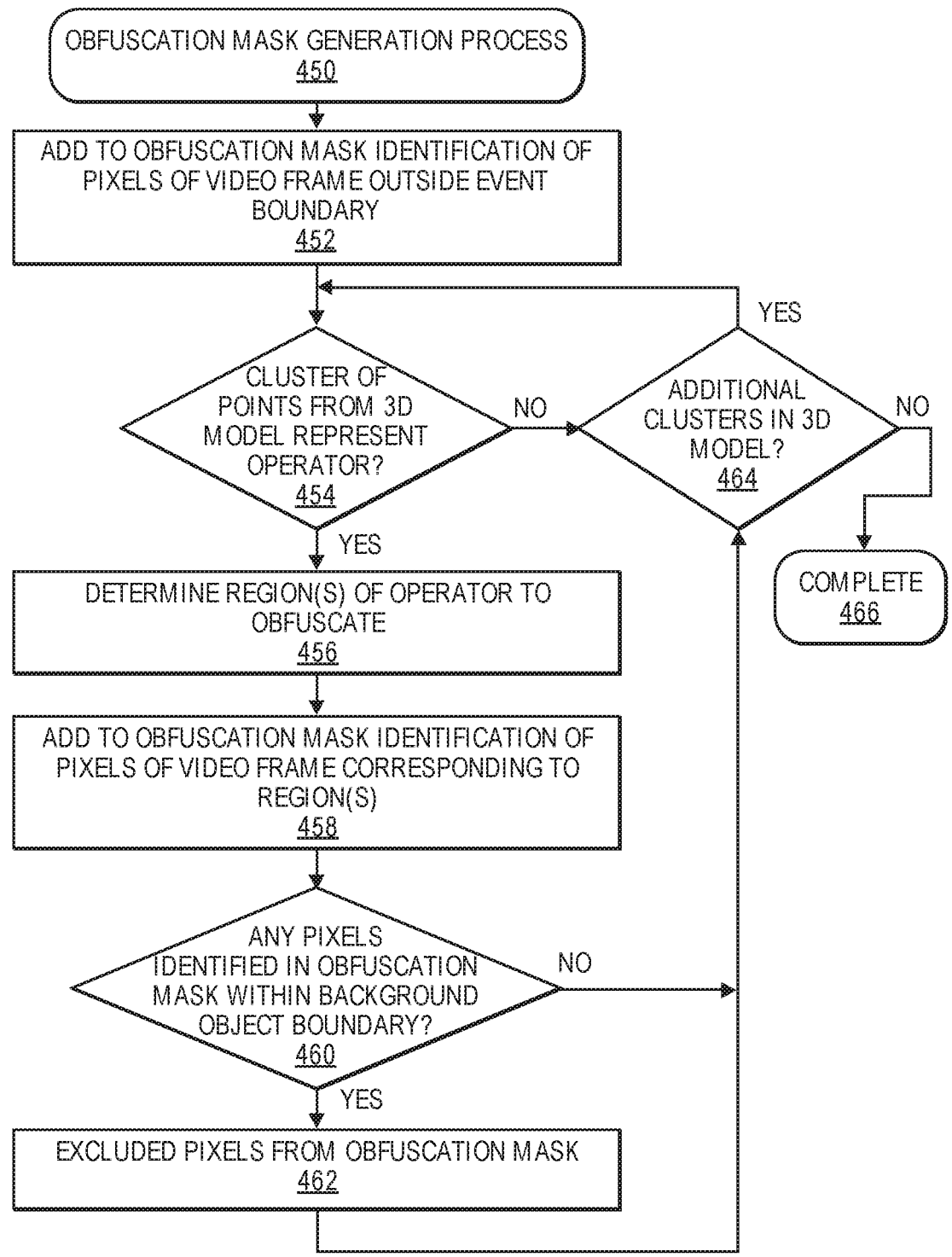
FIG. 4B is an example obfuscation mask generation process, in accordance with implementations of the present disclosure.

FIG. 4B provides an example obfuscation mask generation process 450 that may be used with the example process 400 to produce an obfuscation mask for each frame of the video data that is processed by the example process 400.

The example process 450 begins by adding to an obfuscation mask an identification of pixels of the video frame that are outside the determined event boundary, as in 452. As discussed above, pixels of the video frame that are outside the event boundary are those pixels that are not potentially relevant to an event. For example, pixels outside an event boundary may corresponds to a portion of the video data that is above an inventory shelf and/or beyond an end of the inventory shelf.

A determination may also made as to whether a cluster of points in the 3D model correspond to an operator that is within the field of view of the first or second imaging device, as in 454. A variety of techniques may be used to determine if a cluster of points in the 3D model correspond to an operator. For example, a peak height of a cluster of points may be determined and if the peak height is above a minimum height, such as four feet, it may be determined that the cluster of points corresponds to an operator. If the peak height of the cluster of points in the 3D model is not above the minimum height, it may be determined that the cluster of points does not represent an operator. As another example, an overall shape of each cluster of points in a 3D model may be considered to determine if the cluster of points represents an operator. As still another example, a movement or gait of the objected represented by the cluster of points may be compared across multiple frames to determine whether the cluster of points represents an operator.

If it is determined that the cluster of points do not correspond to an operator, a determination is made as to whether there are additional clusters of points in the 3D model that have not been considered by the example process 450, as in 464. If it is determined that there are additional clusters, the example process returns to decision block 454 and continues with the next cluster. If it is determined that all clusters of points in the 3D model have been considered, the example process 450 completes, as in 466.

If it is determined at decision block 454 that the cluster of points corresponds to an operator, one or more regions of the operator that are to be obfuscated may be determined, as in 456. In some implementations, all representations of an operator are to be obfuscated and thus, the region will be the entire operator. In other implementations, only portions or regions of the operator may be obfuscated. For example, the example process may determine a head region and/or torso region of the operator that are to be obfuscated to maintain the privacy of the operator represented in the video data.

In one example, the different regions may be defined as a percentage of a peak height of the cluster of points of the 3D model determined to represent the operator. For example, a head region may be defined as the portion of the cluster of points of the 3D model having depth values between one-hundred percent of the height of the cluster of points of the 3D model and approximately eighty-two percent of the height of the cluster of points of the 3D model. A torso region may be defined as the portion of the cluster of points of the 3D model between approximately eighty-two percent of the height of the cluster of points of the 3D model and approximately fifty-three percent of the height of the cluster of points of the 3D model. The lower body region may be defined as the portion of the cluster of points of the 3D model having depth values between fifty-three percent of the height of the cluster of points of the 3D model and approximately eight percent of the height of the cluster of points of the 3D model.

For the region(s) of the operator to be obfuscated, an identification of pixels of the video frame corresponding to the real-world coordinates of the points of the cluster of points of the 3D model within the regions are identified in the obfuscation mask, as in 458.

A determination is then made as to whether any pixels identified in the obfuscation mask are within the background object boundary determined for one or more background objects represented in the video data, as in 460. For example, the 3D model representative of an operator may identify a portion of an operator that is reaching into a shelf of an inventory location (a background object) for which a background object boundary is defined.

If it is determined that one or more pixels identified in the obfuscation mask are located within a background object boundary, those pixels are removed or excluded from the obfuscation mask, as in 462. As discussed above, the example process may exclude from the obfuscation mask any pixels that are within a background object boundary so that a reviewing agent is able to view the portions of the video data needed to determine an event or an aspect of an event (e.g., an item involved in an event, such as a pick or a place). If it is determined that none of the pixels identified in the obfuscation mask are located within a background object boundary, or after excluding any pixels from the obfuscation mask that are located within the background object boundary, the example process proceeds to decision block 464 and continues, as discussed above.

While the above example discusses excluding regions or all of a foreground object determined to be an operator, in some implementations, any detected foreground object may be obfuscated. In such an implementation, processing is further reduced by eliminating the processing of the 3D model to determine clusters of the 3D model that correspond to an operator.

In addition, while the above example process 600 describes determining if any pixels identified in the obfuscation mask are within an object boundary, in some implementations, as part of the 3D model generation process, discussed above with respect to FIG. 4A, it may be determined whether points of the 3D model are within a background object boundary. If one or more points of the 3D model are determined to be within the background object boundary, those points may be excluded from the 3D model. By excluding the points from the 3D model, those points will not potentially be included in the obfuscation mask.

Figure 6:
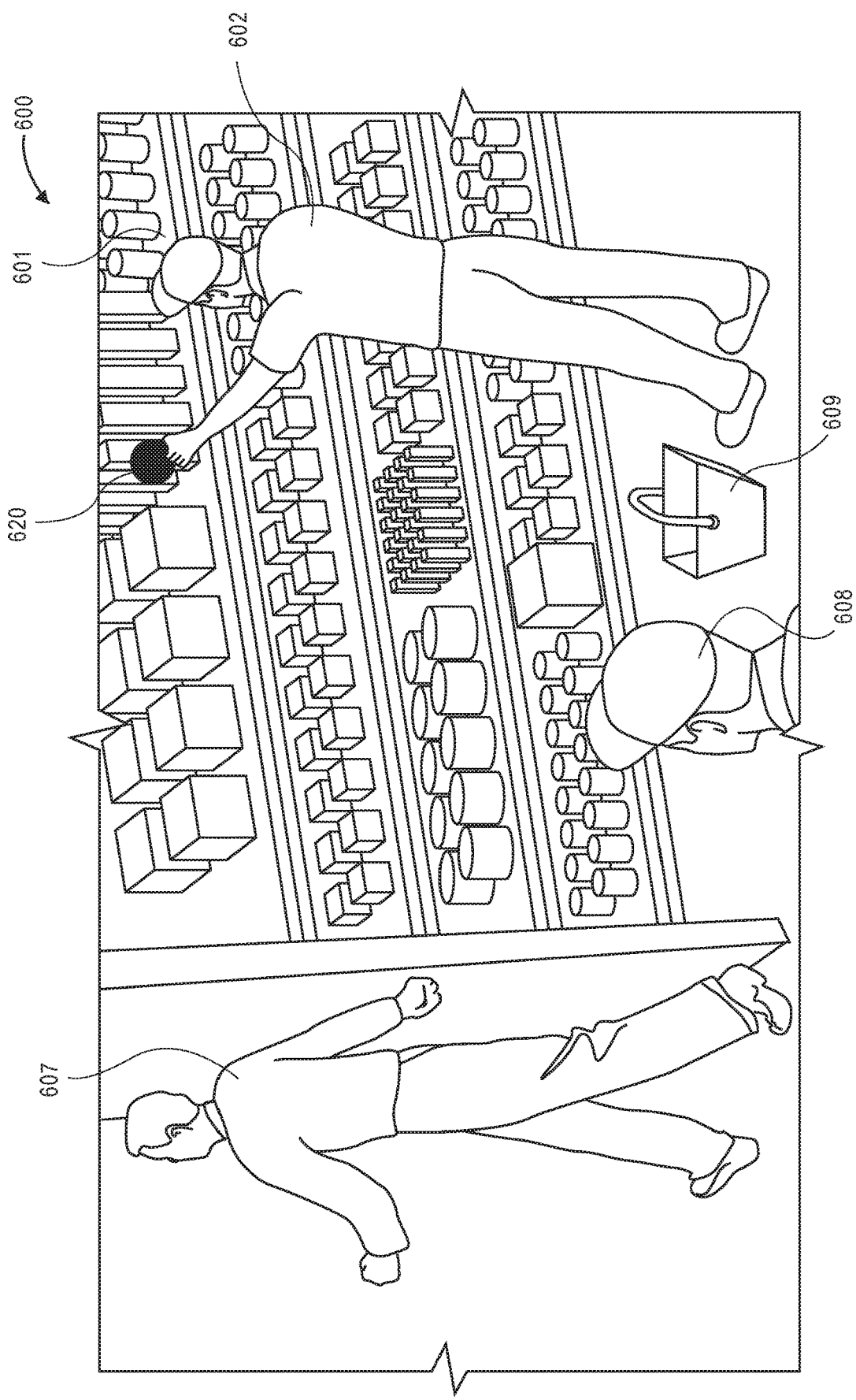
FIG. 6 is a diagram of a video frame of video data of an inventory location obtained with a video camera, in accordance with implementations of the present disclosure.

FIG. 6 illustrates a representation of a video frame 600 of an inventory location 601 in which an event 620 has occurred that is to be presented to a reviewing agent as part of a video stream for consideration, according to an implementation. Also illustrated in the video frame 600 is a representation of three operators 602, 607, 608 and a tote 609.

It is generally difficult to detect or track, using computer processing, a group of pixels belonging to the same foreground object using color information of the pixels. For example, while the operators 602, 607, and 608 and the tote 609 are identifiable in the video frame 600, because of the variation in color of the items on the shelves of the inventory location 601, detection using color processing often results in inaccuracies. Likewise, if multiple foreground objects are within the field of view and represented in the image data such that a portion of the operators overlap from a perspective of the imaging device, it is difficult to process the image data to determine the difference between foreground objects and/or to determine which objects or portions of objects should be obfuscated.

By combining the 3D model for the frame, generated from the depth data of a second device, with the video frame and aligning the 3D model and pixels of the video frame based on real-world coordinates, it can be determined from the mapping of the 3D model with the video data which pixels of the video data correspond to foreground objects, such as operators.

Figure 7:
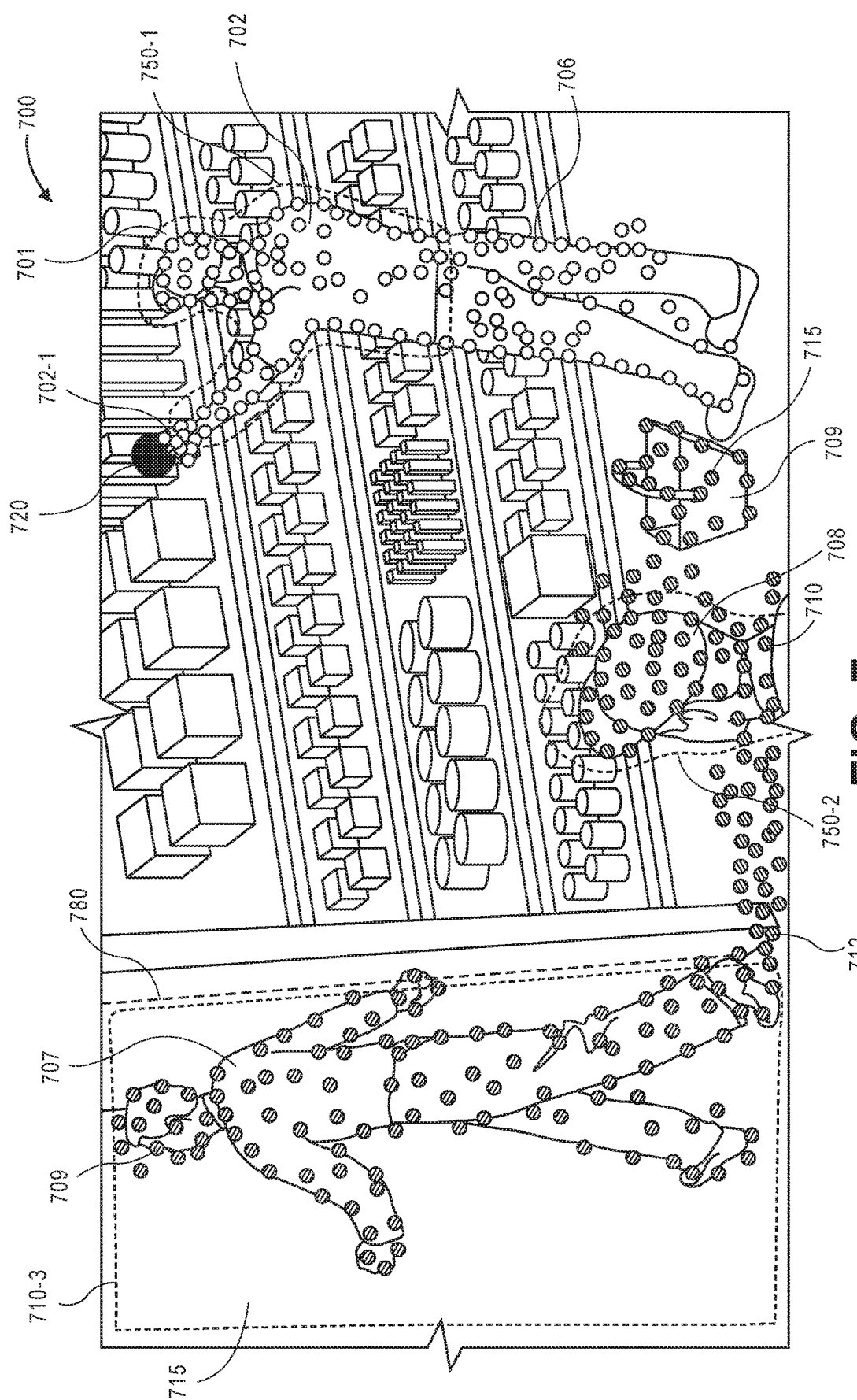
FIG. 7 is a diagram of a video frame of video data of the inventory location with a 3D model overlaid, in accordance with implementations of the present disclosure.

For example, referring to FIG. 7, illustrated is a representation of a composite image 700 that includes the video frame illustrated in FIG. 6 and a representation of the 3D model generated for the foreground objects, according to an implementation. By aligning the video data with the 3D model based on real-world coordinates, it can be determined which pixels of the video frame correspond to the foreground objects. For example, the cluster of points 706 correspond to a first foreground object 702, an operator, the cluster of points 710 correspond to a second foreground object 708 (a second operator), the cluster of points 713 correspond to a third foreground object 707 (a third operator), and the cluster of points 715 correspond to a fourth foreground object 709 (a tote).

As discussed above, the clusters of points may be further processed to determine which clusters correspond to operators and which portions of those clusters correspond to regions of the operators that are to be obfuscated. For example, it may be determined based on the peak heights of the clusters of points 706, 710, and 713, that each of those clusters of points in the 3D model represent operators, because the peak height is above a minimum peak height value. Likewise, it may be determined that the cluster of points 715 does not correspond to an operator because the peak height of those clusters may be below the minimum peak height value.

Likewise, it may be determined from processing of the clusters that the head region and torso region of the first operator 702 is to be included in an obfuscation mask 750-1 and the head region of the second operator 708 is to be included in the obfuscation mask 750-2. Likewise, it may further be determined that the area 715 that is beyond the event boundary 780 is to be included in the obfuscation mask 750-3. Still further, it may be determined that the portion of the first operators hand 702-1 is positioned within the background object boundary corresponding to the background object 701, in this example an inventory shelf, and that pixels representative of that portion of the operator are to be excluded from the obfuscation mask.

Noticeably, the pixels of the video frame representative of the foreground object 709 and the lower body region of the operator 702 are not included in the obfuscation mask. In this example, it is determined that the foreground object 709 and the lower body region of the operator 702 do not need to be obfuscated because they do not reveal any personally identifiable information. As discussed above, in other implementations, some or all of the foreground object 709 and/or the lower portion of the operator may be identified in the obfuscation mask.

Figure 8:
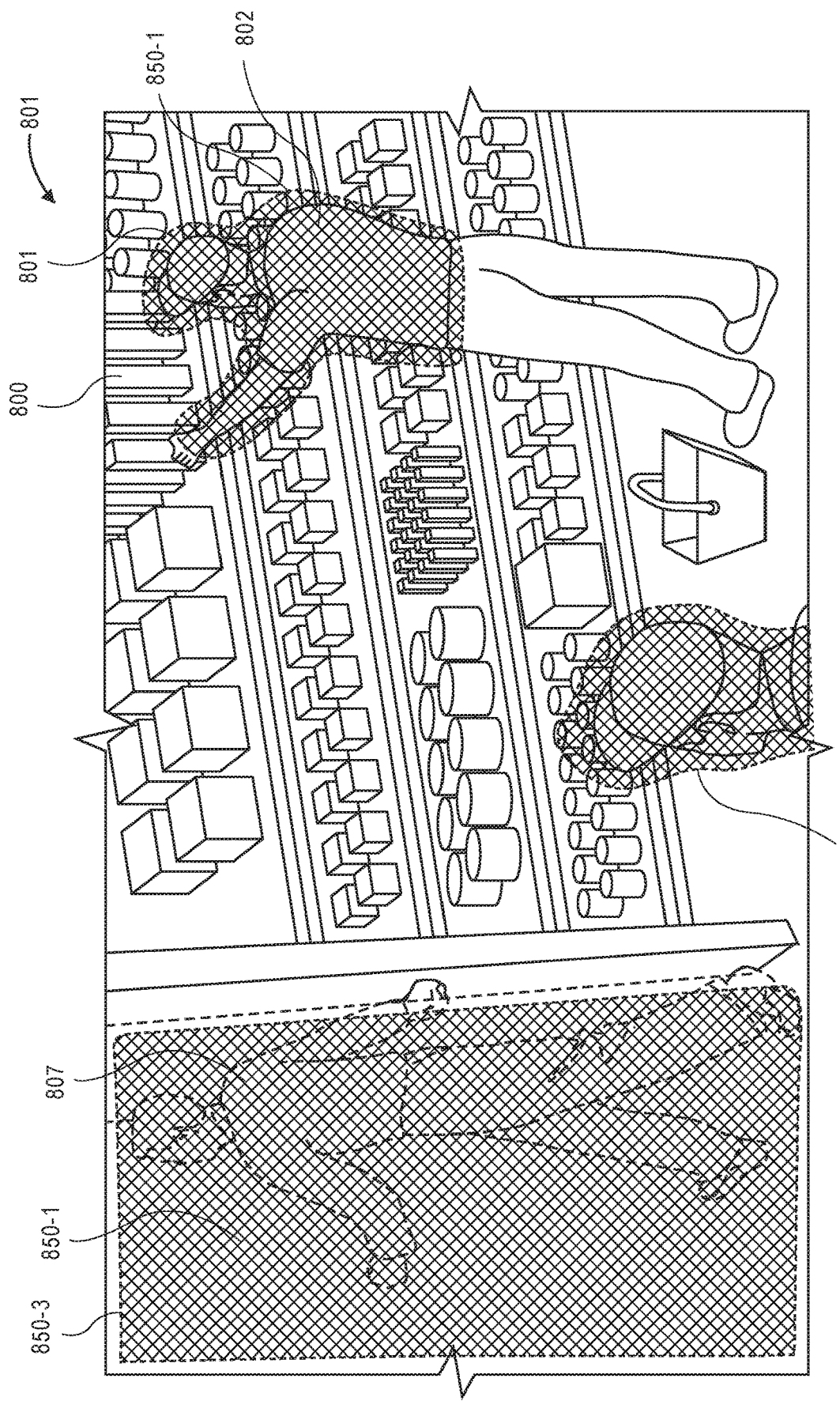
FIG. 8 is a diagram of an obfuscated video frame of obfuscated video data, in accordance with implementations of the present disclosure.

Finally, referring to FIG. 8, based on the obfuscation mask an obfuscation video frame 850 that includes obfuscation pixels corresponding to areas 850-1, 850-2, and 850-3 is generated and presented concurrently with the video frame 800 as an overlay so that the portions of the video data are obfuscated to produce obfuscated video 801, as illustrated by the double hatch markings 850-1, 850-2, and 850-3. As discussed above, a variety of obfuscation techniques may be used to generate the obfuscation video frame 850 that is overlaid atop the video frame 800, to produce obfuscated video 801. For example, a very low-resolution version of the video frame 800 may be generated and pixel values corresponding to the regions 850-1, 850-2, and 850-3 may be used as the obfuscation video frame to obfuscate those portions of the video frame 800. In other implementations, the obfuscation video frame may include pixels with random color values, solid color values, etc., to obfuscate the video frame.

By obfuscating portions of the video data that is presented to the reviewing agent, the identity and privacy of operators represented in the video data is maintained. The described implementations provide a technical advantage over existing systems in that the video data may be processed and obfuscated in real time or near real time, thereby eliminating or limiting any delay in the transmission of video data to a reviewing agent for consideration.

Although some of the implementations disclosed herein reference the tracking and obfuscation of regions of operators (e.g., humans), the systems and methods of the present disclosure are not so limited. For example, the systems and methods disclosed herein may be used to track and obfuscate any objects, including one or more body parts of non-human animals, as well as portions of any number of machines or robots, and are not limited to detecting and tracking human operators. Furthermore, although some of the implementations disclosed herein reference detecting and obfuscating specific objects in a commercial setting, e.g., within a facility such as a fulfillment center, the systems and methods of the present disclosure are likewise not so limited. Rather, the systems and methods disclosed herein may be utilized to detect and obfuscate foreground objects in any type of commercial or non-commercial settings, such as the live filming of performances in a stadium or theater, live filming of vehicular traffic, etc. Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures.

Moreover, with respect to the one or more methods or processes of the present disclosure shown or described herein, including but not limited to the flow charts shown in FIGS. A and 4B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," "may," "real-time," or "near real-time" unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "near," "nearly" or "substantially" as used herein, represent a value, amount, or characteristic close to the stated value, amount, or characteristic that still performs a desired function or achieves a desired result. For example, the terms "about," "approximately," "generally," "near," "nearly" or "substantially" may refer to an amount that is within less than 20% of, within less than 5% of, within less than 2% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method comprising:
   receiving, from a first device, a first depth data corresponding to a location within a first field of view of the first device;
   receiving, from a second device, a first video frame representative of the location within a second field of view of the second device, wherein at least a portion of the first field of view and at least of a portion of the second field of view overlap;
   determining, based at least in part on the first depth data, a first plurality of pixels of the first video frame that are representative of at least a portion of an operator positioned at the location;
   generating an obfuscation mask that indicates a second plurality of pixels corresponding to the first plurality of pixels that are to be obfuscated; and
   generating, based on the first video frame, a second video frame, wherein the second video frame is a lower resolution video frame of the first video frame, wherein the lower resolution is such that an identity of the operator cannot be determined from the second video frame;
   determining a third plurality of pixels of the second video frame that do not correspond to the second plurality of pixels of the obfuscation mask;
   setting color values for each of the third plurality of pixels to transparent; and
   sending, for concurrent display, the first video frame and the second video frame such that the second video frame is overlaid atop the first video frame when presented and obfuscates the operator.

2. The computer-implemented method of claim 1, further comprising:
   determining a background object boundary surrounding at least a portion of a background object that is to be presented without obfuscation; and
   wherein the obfuscation mask does not include an indication of a second plurality of pixels within the background object boundary.

3. The computer-implemented method of claim 2, wherein the background object is presented without obfuscation so that an event at the background object can be detected.

4. The computer-implemented method of claim 2, further comprising:
   determining an event boundary corresponding to at least a portion of the first video frame; and
   adding to the obfuscation mask, an indication of pixels of the first video frame that correspond to a position that it is outside the event boundary.

5. The computer-implemented method of claim 1, wherein determining, based at least in part on the first depth data of the first device, the first plurality of pixels of the first video frame received from the second device that are representative of the operator positioned at the location, further comprises:
   generating, based at least in part on the first depth data, a three-dimensional model ("3D model") that includes a plurality of points;
   correlating, based at least in part on a calibration of the first device and the second device, pixels of the first video frame with a plurality of points of the 3D model; and
   determining, based at least in part on the points of the 3D model, the first plurality of pixels as the pixels of the first video frame aligned with points of the 3D model.

6. The computer-implemented method of claim 5, further comprising:
   determining, for each point of the 3D model, first real-world coordinates corresponding to the point;
   determining, for each pixel of the first video frame, second real-world coordinates corresponding to the pixel; and
   wherein correlating is based at least in part on a mapping of the first real-world coordinates with the second real-world coordinates.

7. The computer-implemented method of claim 5, further comprising:
   determining that a first cluster of points of the 3D model correspond to the operator;
   determining that a second cluster of points of the 3D model do not correspond to the operator; and
   determining the first plurality of pixels as pixels aligned with the first cluster of points but not including pixels aligned with the second cluster of points.

8. The computer-implemented method of claim 5, further comprising:
   determining that a first cluster of points of the 3D model correspond to the operator;
   determining that a second cluster of points of the 3D model correspond to a second operator; and
   determining the first plurality of pixels as pixels aligned with the first cluster of points and pixels aligned with the second cluster of points.

9. The computer-implemented method of claim 1, wherein determining, based at least in part on the first depth data of the first device, the first plurality of pixels of the first video frame received from the second device that are representative of the operator positioned at the location, further comprises:
   generating, based at least in part on the first depth data, a three-dimensional model ("3D model") that includes a plurality of points;

determining a first cluster of points of the 3D model;
determining that the first cluster of points are representative of the operator; and
determining the first plurality of pixels to be pixels aligned with the first cluster of points.

10. The computer-implemented method of claim 9, wherein determining that the first cluster of points are representative of the operator, further comprises:
determining a peak height of the first cluster of points;
determining that the peak height exceeds a threshold; and
determining, based at least in part on determining that the peak height exceeds the threshold, that the first cluster of points are representative of the operator.

11. The computer-implemented method of claim 1, wherein:
the first video frame is a frame of a plurality of frames of a first video received by the first device, and
the determining, generating, generating, determining, and setting color values are performed in real-time or near-real time as frames of the plurality of frames of the first video are received by the first device so that display of the first video frame and the second video frame is not delayed.

12. The computer-implemented method of claim 1, wherein:
the first device and the second device are included in a single unit.

13. An apparatus, comprising:
a location having at least one shelf;
a first imaging device aligned to include at least a portion of the location within a first field of view;
a second imaging device aligned to include at least a portion of the location within a second field of view, wherein at least a portion of the second field of view at least partially overlaps at least a portion of the first field of view; and
a computing device in communication with at least the first imaging device and the second imaging device, wherein the computing device is configured to at least:
receive, from the first imaging device, depth data corresponding to the location;
receive, from the second imaging device, a first video frame representative of the location;
determine, based at least in part on the depth data, a first plurality of pixels of the first video frame that are representative of a first foreground object positioned at the location;
generate an obfuscation mask that indicates a second plurality of pixels corresponding to the first plurality of pixels that are to be obfuscated;
generate, based on the first video frame, a second video frame, wherein the second video frame is a lower resolution video frame of the first video frame, wherein the lower resolution is such that an identity of the first foreground object cannot be determined from the second video frame;
determine a third plurality of pixels of the second video frame that do not correspond to the second plurality of pixels of the obfuscation mask; and
set color values for each of the third plurality of pixels to transparent; and
cause a concurrent presentation of the first video frame and the second video frame such that the second video frame is overlaid atop the first video frame when presented and obfuscates the first foreground object.

14. The apparatus of claim 13, wherein the first video frame and the second video frame are presented on a display of the computing device.

15. The apparatus of claim 13, wherein the computing device is further configured to at least:
send the first video frame and the second video frame to a second computing device; and
wherein the first video frame and the second video frame are concurrently presented by the second computing device.

16. The apparatus of claim 13, wherein the computing device is further configured to at least:
determine, based at least in part on the depth data, that the first foreground object is an operator positioned at the location; and
wherein generation of the obfuscation mask is based at least in part on a determination that the first foreground object is the operator.

17. The apparatus of claim 13, wherein the computing device is further configured to at least:
as the first video frame is received:
determine, based at least in part on the depth data, a fourth plurality of pixels of the first video frame that are representative of a second foreground object positioned at the location;
determine, based at least in part on the depth data, that the second foreground object is not an operator; and
wherein the second video frame does not obfuscate a portion of the first video frame representative of the second foreground object.

18. The apparatus of claim 13, wherein the computing device is further configured to at least:
determine a fourth plurality of pixels of the first video frame that are representative of a background object; and
wherein the second video frame does not obfuscate the fourth plurality of pixels.

19. The apparatus of claim 13, wherein the computing device is further configured to at least:
determine an event boundary corresponding to at least a portion of the first video frame;
indicate in the obfuscation mask a fourth plurality of pixels corresponding to a position that is outside the event boundary; and
wherein the third plurality of pixels do not include the fourth plurality of pixels.

20. The apparatus of claim 13, wherein determination, based at least in part on the depth data, the first plurality of pixels of the first video frame that are representative of the first foreground object positioned at the location, further comprises:
generate, based at least in part on the depth data, a three-dimensional model ("3D model") that includes a plurality of points;
correlate, based at least in part on a calibration of the first imaging device and the second imaging device, pixels of the first video frame with a plurality of points of the 3D model; and
determine, based at least in part on the points of the 3D model, the first plurality of pixels as the pixels of the first video frame aligned with points of the 3D model.

21. The apparatus of claim 20, wherein the computing device is further configured to at least:
determine, for each point of the 3D model, first real-world coordinates corresponding to the point;
determine, for each pixel of the first video frame, second real-world coordinates corresponding to the pixel; and wherein correlation is based at least in part on a mapping of the first real-world coordinates with the second real-world coordinates.

22. The apparatus of claim 13, wherein determination, based at least in part on the depth data, the first plurality of pixels of the first video frame that are representative of the first foreground object positioned at the location, further comprises:
    generate, based at least in part on the depth data, a three-dimensional model ("3D model") that includes a plurality of points:
    determine a first cluster of points of the 3D model;
    determine that the first cluster of points are representative of the first foreground object; and
    determine the first plurality of pixels to be pixels aligned with the first cluster of points.

23. A computer-implemented method comprising:
    determining a first plurality of pixels of a first video frame that are representative of at least a portion of an operator represented in the first video frame;
    determining a second plurality of pixels that are to be obfuscated; and
    generating a second video frame that is a lower resolution video frame of the first video frame, wherein the lower resolution is such that an identity of the operator cannot be determined from the second video frame;
    determining a third plurality of pixels of the second video frame that do not correspond to the second plurality of pixels;
    setting color values for each of the third plurality of pixels to transparent; and
    sending, for concurrent display, the first video frame and the second video frame such that the second video frame is overlaid atop the first video frame when presented and obfuscates the operator.

24. The method of claim 23, further comprising:
generating an obfuscation mask that includes the second plurality of pixels.

* * * * *

UNITED STATES PATENT AND TRADEMARK OFFICE
CERTIFICATE OF CORRECTION

| | |
|---|---|
| PATENT NO. | : 10,956,726 B1 |
| APPLICATION NO. | : 15/839399 |
| DATED | : March 23, 2021 |
| INVENTOR(S) | : Adrian Barkus et al. |

It is certified that error appears in the above-identified patent and that said Letters Patent is hereby corrected as shown below:

On the Title Page

Item (12), should read as, --Barkus et al.--.

Item (72), the first inventor's name "Adrian Quark" should read as, --Adrian Barkus--.

Signed and Sealed this
Third Day of October, 2023

*Katherine Kelly Vidal*

Katherine Kelly Vidal
*Director of the United States Patent and Trademark Office*